United States Patent
Yamaguchi et al.

(10) Patent No.: US 12,469,349 B2
(45) Date of Patent: Nov. 11, 2025

(54) PASSAGE MANAGEMENT METHOD AND PASSAGE MANAGEMENT APPARATUS

(71) Applicant: KABUSHIKI KAISHA TOSHIBA, Tokyo (JP)

(72) Inventors: Osamu Yamaguchi, Yokohama (JP); Hiroo Saito, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 103 days.

(21) Appl. No.: 18/486,268

(22) Filed: Oct. 13, 2023

(65) Prior Publication Data

US 2024/0321028 A1    Sep. 26, 2024

(30) Foreign Application Priority Data

Mar. 22, 2023 (JP) .................................. 2023-045772

(51) Int. Cl.
*G07C 9/15* (2020.01)
*G06T 7/70* (2017.01)
(Continued)

(52) U.S. Cl.
CPC .................. *G07C 9/15* (2020.01); *G06T 7/70* (2017.01); *G06V 40/172* (2022.01); *G07C 9/25* (2020.01); *G06T 2207/30201* (2013.01)

(58) Field of Classification Search
CPC .... G07C 9/15; G07C 9/25; G06T 7/70; G06T 2207/30201; G06V 40/172
(Continued)

(56) References Cited

U.S. PATENT DOCUMENTS 6,232,877 B1 * 5/2001 Ashwin .............. G08B 13/2462
                                                340/568.1
6,801,640 B1 10/2004 Okubo et al.
(Continued)

FOREIGN PATENT DOCUMENTS

JP    2004-265232 A    9/2004
JP      3617373 B2     2/2005
(Continued)

OTHER PUBLICATIONS

Rowley et al., "Neural Network-Based Face Detection", IEEE Transactions on Pattern Analysis and Machine Intelligence, vol. 20, No. 1, Jan. 1998, 16 pages.
(Continued)

*Primary Examiner* — Zhen Y Wu
(74) *Attorney, Agent, or Firm* — Oblon, McClelland, Maier & Neustadt, L.L.P.

(57) ABSTRACT

According to one embodiment, a method includes acquiring ID information read from a medium at a passage zone, identifying a passerby facial image and an accompanier facial image from a captured image of the passage zone, wherein a facial image area of a first user carrying the medium is identified as one of the passerby facial image and the accompanier facial image, and a facial image area of a second user accompanying the first user is identified as the other one of the passerby facial image and the accompanier facial image, and authenticating the first and second users as passage permitted persons if at least one of the passerby facial image and the accompanier facial image matches a correct facial image corresponding to the ID information.

18 Claims, 9 Drawing Sheets

(51) Int. Cl.
*G06V 40/16* (2022.01)
*G07C 9/25* (2020.01)

(58) Field of Classification Search
USPC .......................................................... 340/5.7
See application file for complete search history.

(56) References Cited

U.S. PATENT DOCUMENTS

| | | | | |
|---|---|---|---|---|
| 9,552,684 | B2* | 1/2017 | Bacco | G07C 9/00571 |
| 11,948,398 | B2* | 4/2024 | Hayase | G06Q 20/40145 |
| 2005/0108912 | A1* | 5/2005 | Bekker | G09F 3/005 |
| | | | | 40/633 |
| 2013/0301886 | A1* | 11/2013 | Koda | G06F 21/32 |
| | | | | 382/118 |
| 2015/0015365 | A1* | 1/2015 | Ortiz | G07C 9/25 |
| | | | | 340/5.52 |
| 2015/0221151 | A1* | 8/2015 | Bacco | H04L 9/3231 |
| | | | | 340/5.83 |
| 2016/0217631 | A1* | 7/2016 | Petricoin, Jr. | G05B 15/02 |
| 2019/0057249 | A1* | 2/2019 | Hayase | G06V 40/161 |
| 2020/0118375 | A1* | 4/2020 | Tagawa | G07B 15/00 |
| 2022/0335751 | A1* | 10/2022 | Hayase | G07C 9/25 |
| 2022/0343682 | A1* | 10/2022 | Shimizu | G06F 21/32 |
| 2022/0351548 | A1* | 11/2022 | Yamaoka | G06V 40/172 |
| 2023/0094972 | A1* | 3/2023 | Saito | G07G 1/0036 |
| | | | | 382/118 |
| 2023/0126015 | A1* | 4/2023 | Inoue | G06V 20/52 |
| | | | | 340/5.7 |
| 2023/0267788 | A1* | 8/2023 | Yokoyama | G07C 9/10 |
| | | | | 382/115 |
| 2024/0144762 | A1 | 5/2024 | Saito et al. | |
| 2025/0139215 | A1* | 5/2025 | Morishita | G06F 21/32 |

FOREIGN PATENT DOCUMENTS

| | | |
|---|---|---|
| JP | 2008-71205 A | 3/2008 |
| JP | 4506381 B2 | 7/2010 |
| JP | 2024-65337 A | 5/2024 |
| WO | WO 2020/152917 A1 | 7/2020 |

OTHER PUBLICATIONS

Cao et al., "OpenPose: Realtime Multi-Person 2D Pose Estimation Using Part Affinity Fields", IEEE Transactions on Pattern Analysis and Machine Intelligence, vol. 43, No. 1, Jan. 2021, 15 pages.
Liu et al., "SSD: Single Shot MultiBox Detector", ECCV 2016, 17 pages.
Rothe et al., "DEX: Deep Expectation of apparent age from a single image", ICCV 2015, 6 pages.
Kim et al., "A Comparison of Embedded Deep Learning Methods for Person Detection", 2018, 8 pages.
Kiapour et al., "Where to Buy It: Matching Street Clothing Photos in Online Shops", ICCV 2015, 9 pages.
Bewley et al., "Simple Online and Real Time Tracking", ICIP 2016, 5 pages.

* cited by examiner

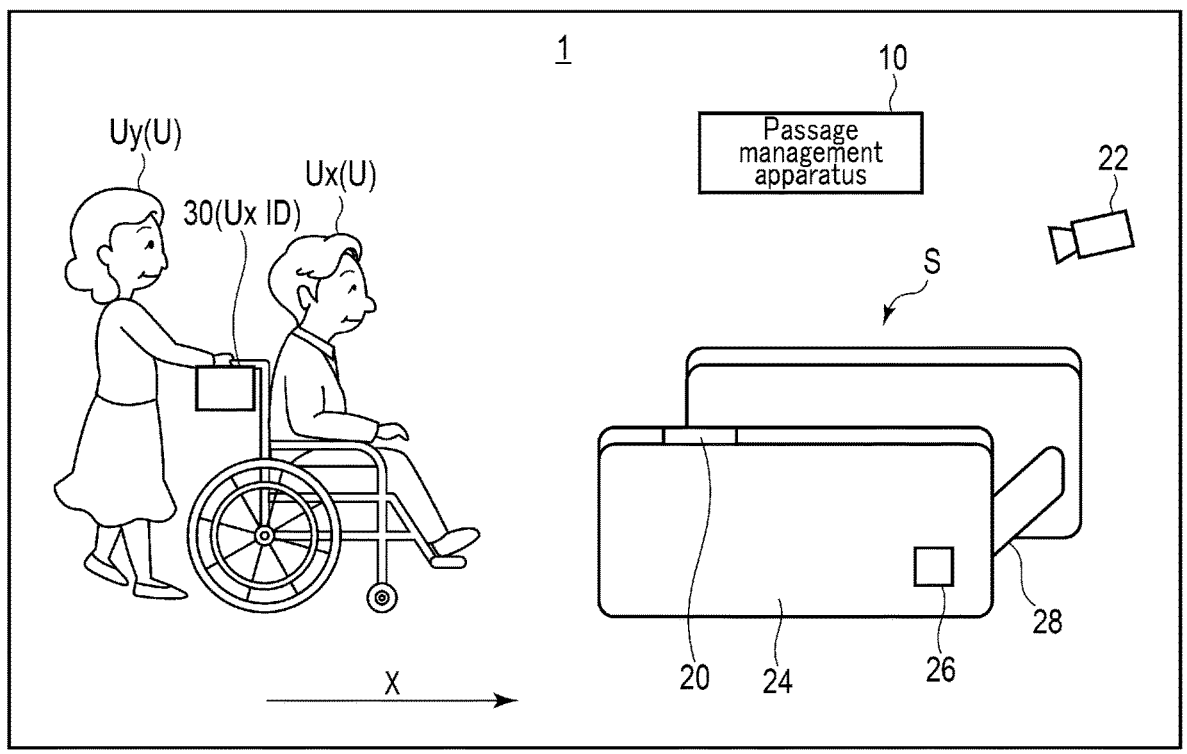
F I G. 1

121

| Identification information | Correct facial image | Auxiliary attribute information |

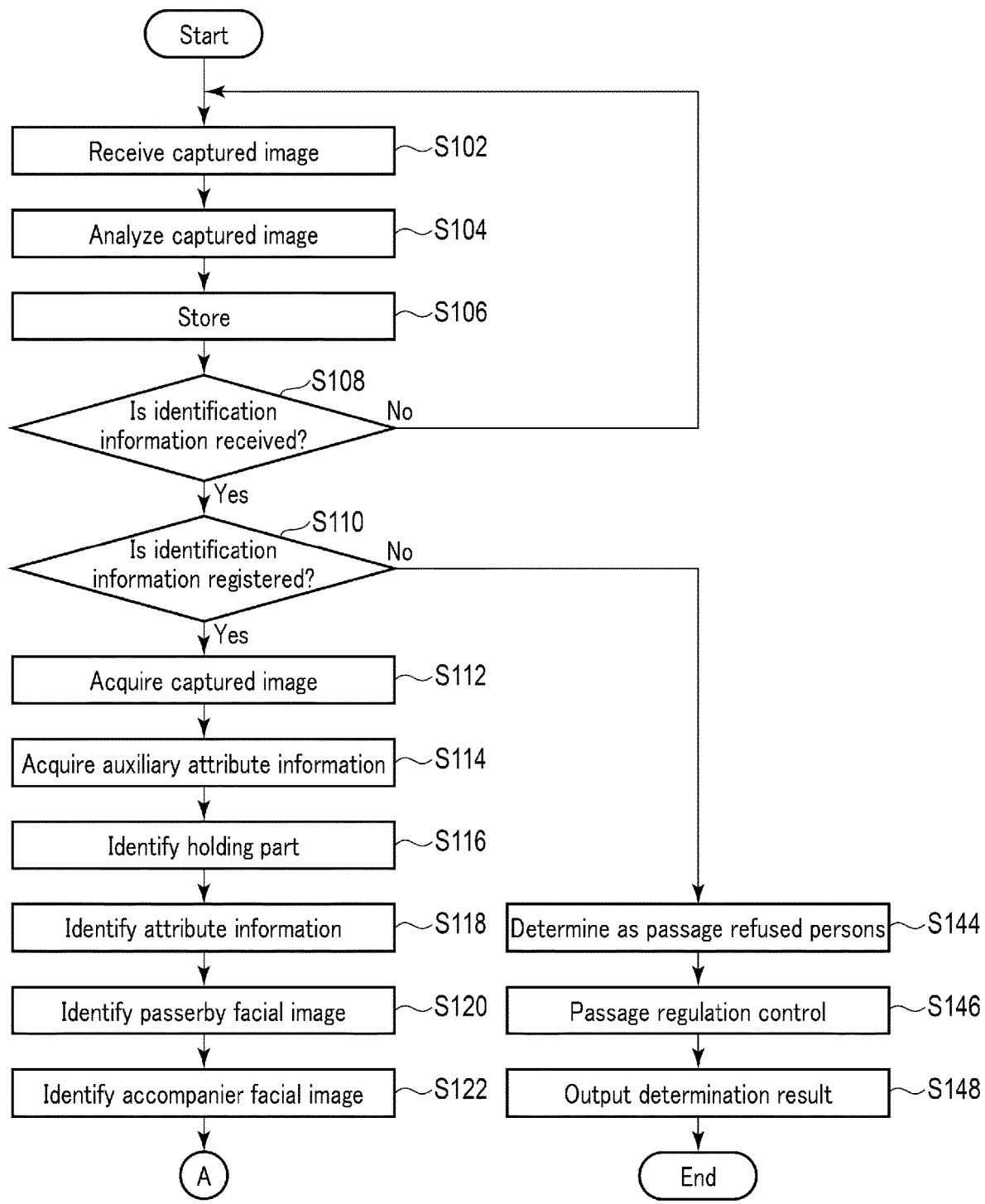
F I G. 11A

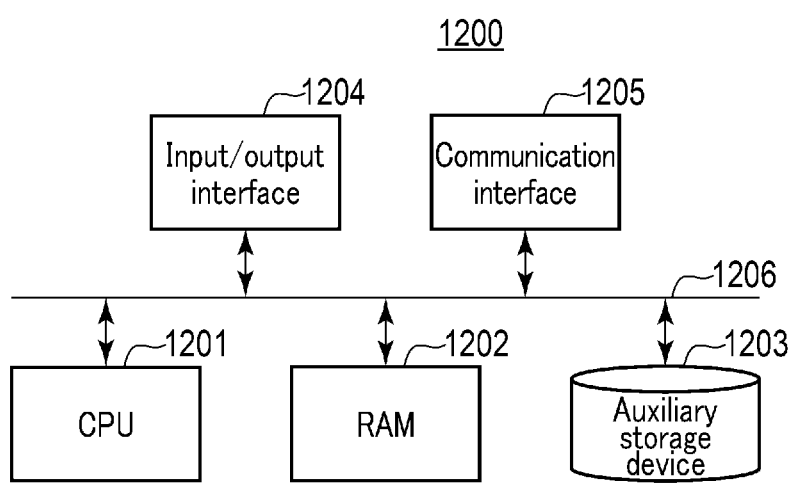
F I G. 12

PASSAGE MANAGEMENT METHOD AND PASSAGE MANAGEMENT APPARATUS

CROSS-REFERENCE TO RELATED APPLICATION

This application is based upon and claims the benefit of priority from Japanese Patent Application No. 2023-045772, filed Mar. 22, 2023, the entire contents of which are incorporated herein by reference.

FIELD

Embodiments described herein relate generally to a passage management method and a passage management apparatus.

BACKGROUND

Systems for authenticating a user who is passing through a passage zone have been known. Among these systems is a system configured to deny the authentication if the positional relationship between the face and other body parts in a captured image of a passerby is found to be abnormal. A system for stopping an unauthorized passage when an unauthorized passerby is trying to pass through a passage zone with an authorized passerby has also been disclosed. Moreover, a technique for denying authentication when identification information read from an authentication medium is inconsistent with prestored identification information has been known.

With conventional techniques, however, fraud prevention may become unreliable if a captured image includes a user with authorization and a user without authorization at the same time or if a user without authorization is carrying an authentication medium of a user with authorization. This may degrade security in passage.

There is also a system for allowing passage of multiple users through a gate. In some cases, a passage needs to be allowed in a situation where a user without authorization is carrying an authentication medium of a user with authorization. For instance, a user who is assisting a user in a wheelchair may be carrying an authentication medium on behalf of the wheelchair user and trying to make a passage. In a system aimed at spoofing prevention, this passage may be stopped. In order to enhance convenience, however, the passage needs to be allowed. In other situations, a user with authorization may try to make a passage with an accompanying small child. The simultaneous passage may not be allowed if this child is unregistered in a system, which degrades the convenience of the system.

BRIEF DESCRIPTION OF THE DRAWINGS

FIG. 1 is a schematic diagram showing a passage management system according to an embodiment.

FIG. 11A is a flowchart showing the procedure of a passage management process implemented by the passage management apparatus of FIG. 2.

FIG. 12 is a block diagram showing a hardware structure of a computer that realizes the passage management apparatus of FIG. 2.

DETAILED DESCRIPTION

Figure 2:
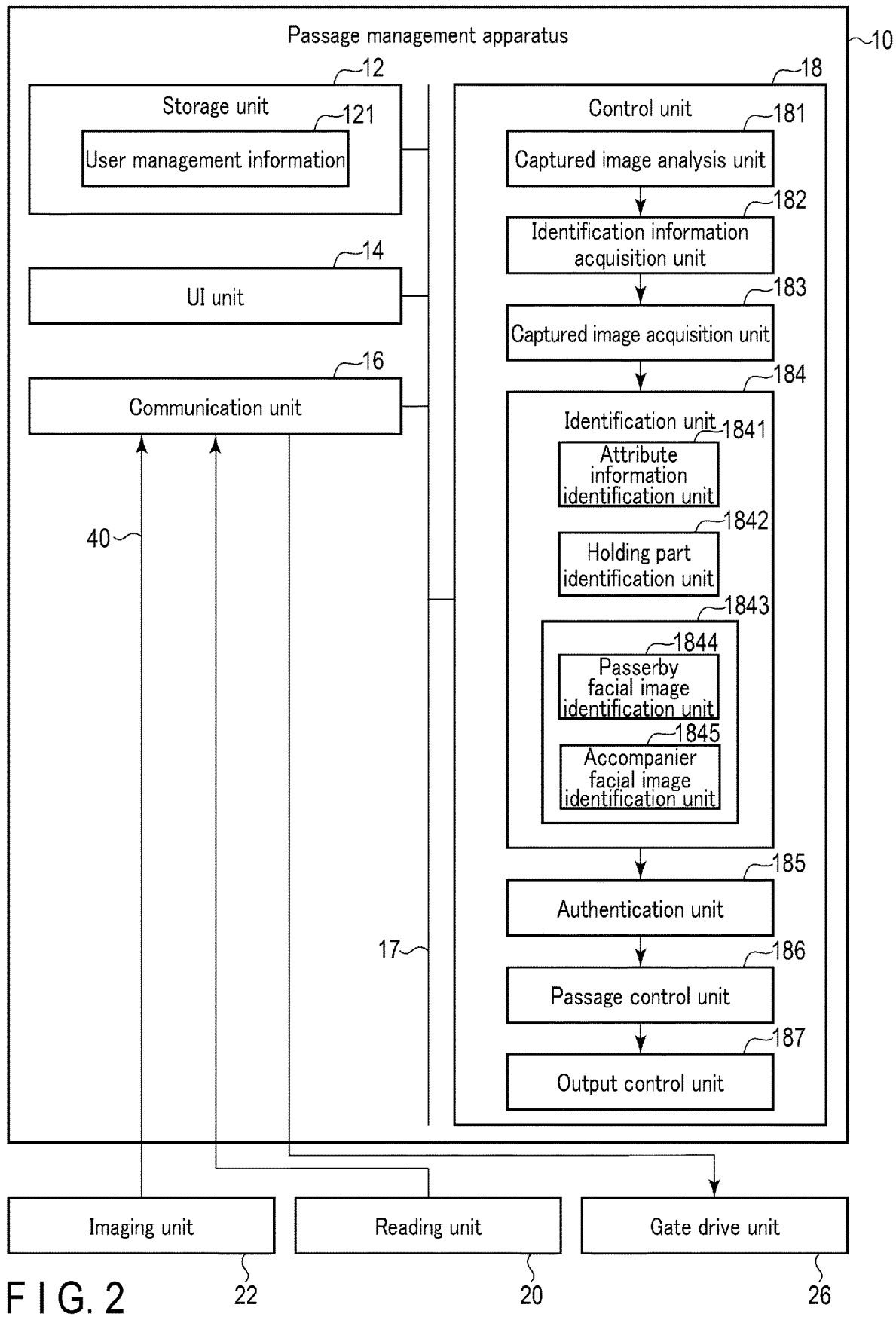
FIG. 2 is a block diagram showing a functional structure of the passage management apparatus in FIG. 1.

According to one embodiment, a non-transitory computer readable medium including computer executable instructions, wherein the instructions, when executed by a processor, cause the processor to perform a method. The method includes acquiring identification (ID) information read from an authentication medium by a reading unit installed in a passage zone. The method further includes acquiring a captured image of the passage zone. The method further includes identifying, from multiple facial image areas included in the captured image, a passerby facial image and an accompanier facial image, wherein a facial image area of a first user, who carries the authentication medium, is identified as either one of the passerby facial image and the accompanier facial image, and a facial image area of a second user, who accompanies the first user, is identified as the other one of the passerby facial image and the accompanier facial image. The method further includes authenticating the first user and the second user as passage permitted persons if at least one of the passerby facial image and the accompanier facial image matches a correct facial image corresponding to the identification information.

Hereinafter, embodiments will be described with reference to the accompanying drawings.

FIG. 1 schematically shows an exemplary structure of a passage management system 1 according to the present embodiment. As illustrated in this drawing, the passage management system 1 includes a passage management apparatus 10, a reading unit 20, and an imaging unit 22. The passage management apparatus 10 is coupled to the reading unit 20 and imaging unit 22 in a communicable manner.

The passage management apparatus 10 is an information processing apparatus configured to manage the passage of a user U who is trying to pass through a passage zone S.

The passage zone S is a management target zone for which the passage management apparatus 10 manages passages of users U. The passage zone S may be an entrance through which an entry to and egress from a certain area is made, or a boundary between a certain area and another area, where the "area" indicates a target area of management of entries and egresses. Examples of such an area may include an interior area of a building, an area for public transportation such as trains, and a specific outdoor area, which are not limitations.

The passage zone S may be provided with a gate device 24. This gate device 24 is an enclosure arranged in the passage zone S, in which a reading unit 20, a gate drive unit 26, and a door member 28 are provided.

The reading unit 20 is configured to read identification information of a user U from an authentication medium 30. The reading unit 20 is provided in the passage zone S. In the example of FIG. 1, the reading unit 20 is arranged in the gate device 24 installed in the passage zone S. In response to an approach of the authentication medium 30 with or without a contact, the reading unit 20 reads identification information from the authentication medium 30, and transmits the read identification information to the passage management apparatus 10. An approach here represents positioning of the authentication medium 30 and reading unit 20 within a communicable distance range.

The reading unit 20 may be a bar-code reader that reads a bar-code and transmits the identification information, a magnetic card reader that reads magnetic information and transmits the identification information, a device that reads identification information from a captured image and transmits the information, or a device that reads identification information from a storage medium such as a memory card and transmits the information. A bar-code may be one-dimensional or two-dimensional.

The authentication medium 30 is a portable medium that can be carried by a user U, and provides the identification information of the user U in a manner readable for the reading unit 20. The identification information of the user U can be any information that can uniquely identify the user U, which may be a management number such as an employee code of the user U, a passport number assigned to the user U, or the like. The identification information, however, is not limited thereto.

The authentication medium 30 may be a portable terminal that can display the bar-code representing the identification information of the user U on a display screen. If this is the case, the authentication medium 30 may be a smartphone or tablet terminal having a display device. Alternatively, the authentication medium 30 may be a paper or resin medium on which a character string or a bar-code representing the identification information of the user U is printed or stored. If this is the case, the authentication medium 30 may be a passport or transportation ticket, an employee ID, or the like. The authentication medium 30 may include a storage medium in which the identification information of the user U is stored so that, when being brought into contact with or close to the reading unit 20, the reading unit 20 can read the identification information from the storage medium. If this is the case, the authentication medium 30 will be a device equipped with a communication function and a storage medium.

In the present embodiment, it is assumed that the authentication medium 30 is a paper medium on which a character string or bar-code that represents identification information is printed, or a portable terminal that can display a character string or bar-code that represents identification information. It is further assumed that, when the character string or bar-code representing the identification information in the authentication medium 30 is brought into contact with or in proximity to the reading unit 20, the reading unit 20 according to the present embodiment reads the identification information from the authentication medium 30 and transmits the identification information to the passage management apparatus 10.

The imaging unit 22 is a device that captures images of the passage zone S and transmits the captured image data to the passage management apparatus 10. Hereinafter, "captured image data" will be simply referred to as a "captured image". The angle of view and imaging direction of the imaging unit 22 are adjusted in advance such that the imaging range will include the reading unit 20 in the passage zone S and also will include, when a user U is present near the reading unit 20, the face and other body parts of this user U. According to the present embodiment, the imaging unit 22 sequentially captures images of the passage zone S in time series and sequentially transmits the captured images to the passage management apparatus 10. Furthermore, the imaging unit 22 attaches an imaging time to each of the captured images, and transmits to the passage management apparatus 10 the captured images with the imaging times attached.

The gate drive unit 26 is a drive mechanism for driving the door member 28. The gate drive unit 26 is connected to the passage management apparatus 10 in a communicable manner. Under the control of the passage management apparatus 10, the gate drive unit 26 drives the door member 28. With the gate drive unit 26 driving the door member 28, the state of the door member 28 is switched so as to allow or regulate the passage of the user U through the passage zone S. The door member 28 may be configured to open and close, and with the gate drive unit 26 switching the door member 28 to an open state, the user U is allowed to pass through the passage zone S in an X direction as indicated by an arrow. With the gate drive unit 26 switching the door member 28 to a closed state, the passage of the user U through the passage zone S is regulated.

As mentioned earlier, the authentication medium 30 is a medium that can be carried by the user U, and the user U's identification information is readable for the reading unit 20. The user U carrying the authentication medium 30 enters the passage zone S, and brings the authentication medium 30 into contact with or into proximity to the reading unit 20 in order to pass through the passage zone S in the X direction as indicated by the arrow. The passage of the user U through the passage zone S is managed by the passage management apparatus 10.

Multiple users U may try to pass through the passage zone S together. In the example of FIG. 1, a user Uy is a person assisting a user Ux in a wheelchair. The user Uy is carrying the user Ux's authentication medium 30 on behalf of the user Ux, and is trying to pass through the passage zone S together with the user Ux. The users Ux and Uy are each an example of a user U. The authentication medium 30 stores the user Ux's identification information (UxID), and the user Ux is an authorized passerby. An authorized passerby represents a user whose identification information is registered in the passage management apparatus 10 so as to allow his/her passage through the passage zone S. The passage management apparatus 10 is configured to allow the user Uy's passage together with the user Ux's passage through the passage zone S. The passage of the users Ux and Uy together through the passage zone S will be described later.

In the example of FIG. 1, one passage zone S is provided, and a gate device 24 is installed in this passage zone S. As another embodiment, multiple passage zones S may be provided, and a gate device 24 may be installed in each of these multiple passage zones S. If this is the case, the passage management apparatus 10 manages the passages of users for each of the passage zones S. In other word, the passage management apparatus 10 manages the reading unit 20, imaging unit 22, and gate drive unit 26 provided in the gate device 24 of each passage zone S. According to the present embodiment, one reading unit 20, one imaging unit 22, and one gate drive unit 26 are provided in each passage zone S, and the passage management apparatus 10 manages the reading units 20, imaging units 22, and gate drive units 26.

FIG. 2 schematically shows an exemplary functional structure of the passage management apparatus 10. For the sake of explanation, the imaging unit 22, reading unit 20, and gate drive unit 26 are also included in FIG. 2.

The passage management apparatus 10 includes a storage unit 12, a user interface (UI) unit 14, a communication unit 16, and a control unit 18. The storage unit 12, UI unit 14, communication unit 16, and control unit 18 may be coupled to one another by a bus 17.

The storage unit 12 stores therein various kinds of data. According to the present embodiment, the storage unit 12 stores user management information 121 in advance.

Figures 3, 4:
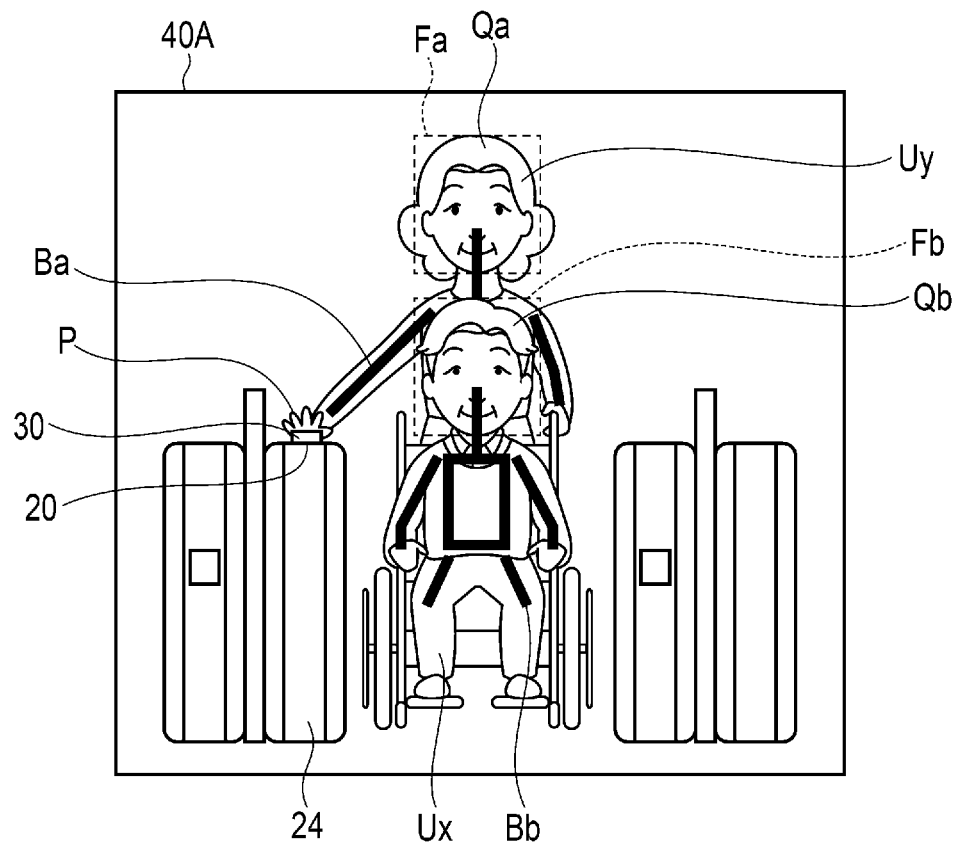
FIG. 3 is a diagram showing the user management information stored in the storage unit in FIG. 2.
FIG. 4 is a diagram showing an exemplary image captured by an imaging unit illustrated in FIG. 1.

FIG. 3 schematically shows an exemplary data structure of the user management information 121. The user management information 121 is included in a database for managing the information of users whose passage is to be allowed. The data format of the user management information 121 is not limited to a database. As shown in FIG. 3, the user management information 121 is included in a database in which the identification information of the users U is associated with correct facial images. A correct facial image may be a facial image of the user U (i.e. authorized passerby) identified with the corresponding identification information. The facial image of the user U may be data obtained by extracting a facial image area from an image that has been obtained by photographing the user U. In the user management information 121, the identification information and the correct facial image of the user U identified by this identification information are registered in association with each other through a registration process or the like performed by the control unit 18.

As a correct facial image, a facial image of an authorized accompanier may also be registered. An authorized accompanier (accompanying person) is a user authorized to accompany an authorized passerby, or in other words, a user who is allowed to pass through the passage zone S together with the authorized passerby. A correct facial image includes at least one of the facial images of the authorized passerby and the facial image of the authorized accompanier. That is, a correct facial image may include the facial image of the authorized passerby or the facial image of the authorized accompanier, or may include both the facial image of the authorized passerby and the facial image of the authorized accompanier. The correct facial image may include facial images of multiple authorized accompaniers.

The user management information 121 may further include auxiliary attribute information associated with the identification information. The auxiliary attribute information represents information regarding a mode of a passage of the passerby. For instance, the auxiliary attribute information may include information designating "assistance required", "substitute passerby", or "child accompanying" out of predetermined categories, where "assistance required" denotes that the authorized passerby requires assistance, "substitute passerby" denotes an authorized passerby whose facial image is not usable for authentication, and "child accompanying" denotes that the authorized passerby is accompanied by a small child. The auxiliary attribute information is used for switching the procedure of the processing that includes facial image recognition and authentication, which will be described later.

With reference to FIG. 2, the UI unit 14 is provided with a function of displaying various kinds of information and a function of receiving operational inputs from users. The display function corresponds, for example, to a display device and a projection device. The input function corresponds, for example, to a pointing device such as a mouse and touch pad, and a keyboard. A touch panel, in which the display function and input function are integrally formed, may be adopted.

The communication unit 16 is a communication interface for communicating with an information processing apparatus that is located outside the passage management apparatus 10. According to the present embodiment, the communication unit 16 communicates with the imaging unit 22, reading unit 20, and gate drive unit 26 of the gate device 24 in the passage zone S, via a network or the like in a wired or wireless manner.

At least either one of the storage unit 12 and UI unit 14 may be provided outside the passage management apparatus 10. In this case, the externally provided one of the storage unit 12 and UI unit 14 is configured to be communicable with the passage management apparatus 10 via a network and the communication unit 16.

At least one of the storage unit 12, the UI unit 14, and the functional units included in the control unit 18, which will be described later, may be mounted on an external information processing apparatus coupled to the passage management apparatus 10 via a network in a communicable manner.

The control unit 18 executes information processing at the passage management apparatus 10. The control unit 18 includes a captured image analysis unit 181, an identification information acquisition unit 182, a captured image acquisition unit 183, an identification unit 184, an authentication unit 185, a passage control unit 186, and an output control unit 187.

The captured image analysis unit 181, identification information acquisition unit 182, captured image acquisition unit 183, identification unit 184, authentication unit 185, passage control unit 186, and output control unit 187 may be realized by one or more processors. These units may be realized by a processor such as the central processing unit (CPU) implementing a program, i.e. by software. The units may be realized by a processor such as a specifically designed IC or circuit, i.e. by hardware. Alternatively, the units may be realized by software and hardware in combination. If multiple processors are adopted, a single processor may be configured to implement one of the units or two or more of the units.

The captured image analysis unit 181 sequentially receives captured images 40 from the imaging unit 22. As described earlier, the imaging unit 22 captures the images of the passage zone S and transmits the captured images 40 with their imaging times attached, sequentially to the passage management apparatus 10. The captured image analysis unit 181 sequentially receives from the imaging unit 22 via the communication unit 16 the captured images 40 with the imaging times attached. The imaging time attached to a captured image 40 indicates the time at which this captured image 40 is captured.

Figure 5:
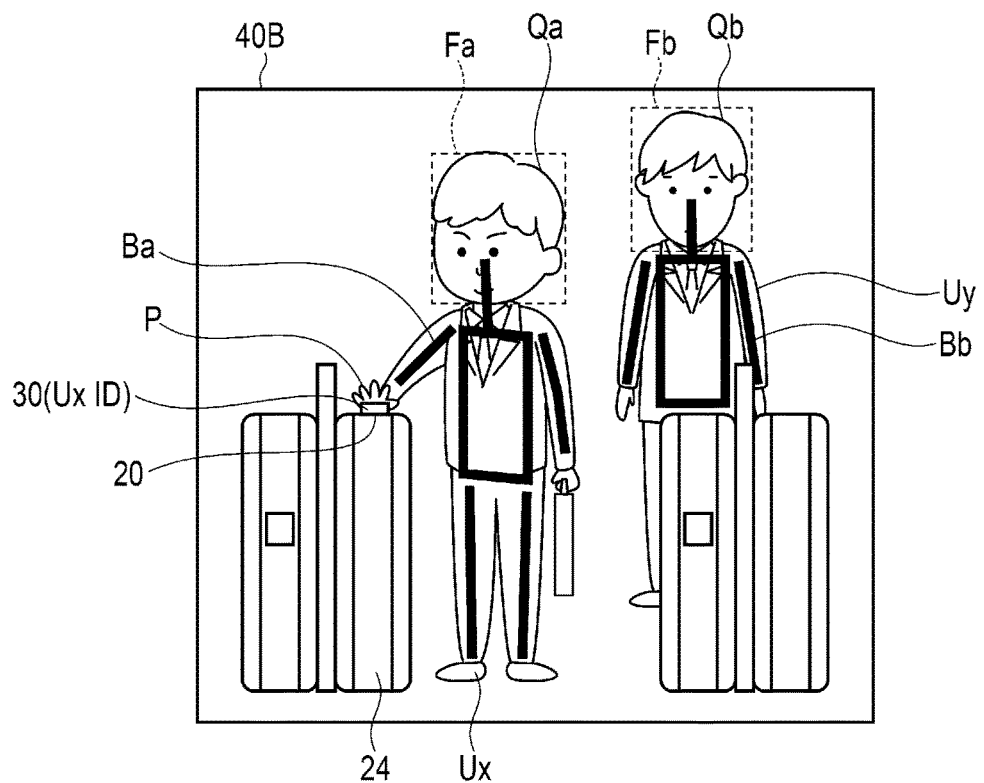
FIG. 5 is a diagram showing another exemplary image captured by the imaging unit in FIG. 1.

FIGS. 4 and 5 show exemplary captured images 40 obtained by the imaging unit 22. The captured image 40A of FIG. 4 has been taken when the user Uy touches the reading unit 20 with the authentication medium 30 of the user Ux in a wheelchair on behalf of the user Ux. The captured image 40B of FIG. 5 has been taken when two users Ux and Uy are sequentially passing through the passage zone S, and the user Ux is touching the reading unit 20 with his own authentication medium 30.

By referring to FIG. 2, every time a new captured image 40 is received, the captured image analysis unit 181 analyzes the captured image 40 to generate an analysis result. The captured image analysis unit 181 acquires the facial image area F and pose estimation information B of the user U who is in the captured image 40, as an analysis result.

The facial image area F indicates the area of the face of a user U in the captured image 40. Using a known image processing technique for identifying a facial image area from an image, the captured image analysis unit 181 may analyze the facial image area F of the user U in the captured image 40. Exemplary known image processing techniques for identifying a facial image area from an image include "Henry A. Rowley, Shumeet Baluja, and Takeo Kanade: Neural Network-Based Face Detection, IEEE Transactions on Pattern Analysis and Machine Intelligence, Vol. 20, Issue 1, January 1998, pp. 23-38", which is not a limitation.

In the case of the captured image 40A of FIG. 4, the captured image analysis unit 181 identifies the facial image area Fa of the user Ux and the facial image area Fb of the user Uy from the captured image 40A. The facial image area Fa and facial image area Fb are examples of the facial image area F.

The pose estimation information B represents the skeleton of the user U in the captured image 40. The pose estimation information may indicate the positions and shapes of different bones that constitute the user U in each captured image 40. With the pose estimation information B, the positions of the body parts of the user U in the captured image 40 can be identified.

A known image processing technique for analyzing pose estimation information from an image may be adopted for the captured image analysis unit 181 to analyze the pose estimation information B. Examples of the known image processing technique for analyzing pose estimation information from an image include "Z. Cao, G. Hidalgo Martinez, T. Simon, S. Wei, and Y. A. Sheikh: OpenPose: Real-time Multi-Person 2D Pose Estimation using Part Affinity Fields, IEEE Transactions on Pattern Analysis and Machine Intelligence, Vol. 43, Issue 1, January 2021, 172-186.", which is not a limitation.

In the case of the captured image 40A of FIG. 4, the captured image analysis unit 181 identifies the pose estimation information Ba of the user Ux and the pose estimation information Bb of the user Uy from the captured image 40A. The pose estimation information Ba and pose estimation information Bb are examples of the pose estimation information B.

By referring to FIG. 2, the captured image analysis unit 181 may use object detection to recognize an object included in the captured image 40 and generate object recognition information. The analysis result of the captured image 40 may include the object recognition information. For instance, an object detector may be provided in advance to detect certain objects such as a wheelchair and a white cane from an image, and the captured image analysis unit 181 performs a detection process upon a captured image 40 by use of this object detector to detect an object. Examples of the object detection include "Wei Liu, Dragomir Anguelov, Dumitru Erhan, Christian Szegedy, Scott Reed, Cheng-Yang Fu, Alexander C. Berg, 'SSD: Single Shot MultiBox Detector', In Proc. ECCV (2016)", which is not a limitation. Upon detection of an object from a captured image 40, the captured image analysis unit 181 generates object recognition information to indicate that a specific object is included in the captured image 40, and if none of the specific objects is detected from the captured image 40, the captured image analysis unit 181 generates object recognition information to indicate that no specific object is included in the captured image 40.

Every time a new captured image 40 is received from the imaging unit 22, the captured image analysis unit 181 analyzes the captured image 40 to associate the captured image 40 with the analysis result and imaging time, and stores the resultant data in the storage unit 12. The captured image analysis unit 181 may accumulate the captured images 40 in the storage unit 12 until the stored images reach a predetermined number or a predetermined data amount. If the number or amount of stored images reaches the predetermined number or amount and a new captured image 40 needs to be stored in the storage unit 12, the captured image analysis unit 181 may erase the captured images 40 having older imaging times from the storage unit 12 in chronological order, associate the newly received captured image 40 with the analysis result and imaging time, and store it in the storage unit 12. Alternatively, the captured image analysis unit 181 may control the storage of the captured images 40 in the storage unit 12 such that captured images 40 taken in a predetermined period from the present to the past are stored in the storage unit 12.

The identification information acquisition unit 182 acquires identification information read from an authentication medium 30 at the reading unit 20 installed in the passage zone S. For instance, when a user U carrying an authentication medium 30 brings the authentication medium 30 into proximity to the reading unit 20, the reading unit 20 reads the identification information from the authentication medium 30. Every time the reading unit 20 reads identification information from an authentication medium 30, the reading unit 20 transmits to the passage management apparatus 10 the read-out identification information and the read-out time in association with each other. The read-out time represents a time point at which the identification information is read. The identification information acquisition unit 182 acquires the identification information and the read-out time corresponding to the identification information from the reading unit 20 through the communication unit 16.

The captured image acquisition unit 183 acquires the captured images 40 of the passage zone S. The captured image acquisition unit 183 reads from the storage unit 12 the captured images 40 analyzed by the captured image analysis unit 181 to acquire the captured images 40 of the passage zone S.

The captured image acquisition unit 183 acquires at least a captured image 40 at the time of reading the identification information at the reading unit 20. For instance, every time the identification information acquisition unit 182 acquires the identification information, the captured image acquisition unit 183 reads from the storage unit 12 a captured image 40 corresponding to the same imaging time as the read-out time of the identification information so that the captured image 40 at the time of reading the identification information at the reading unit 20 can be acquired.

In order to acquire from the storage unit 12 a captured image 40 at the time of reading the identification information at the reading unit 20, the captured image acquisition unit 183 may be configured to read a captured image 40 that corresponds to an imaging time which falls within a predetermined length of time from the read-out time corresponding to the identification information acquired by the identification information acquisition unit 182. This predetermined length of time can be determined such that the read-out time of the identification information can be regarded as coinciding with the imaging time of the captured image 40. According to the present embodiment, the captured image acquisition unit 183 reads from the storage unit 12 a captured image 40 that satisfies this condition and the analysis result corresponding to this captured image 40, and thereby acquires the captured image 40 and analysis result.

The identification unit 184 identifies, from among one or more facial image areas F included in a captured image 40, the facial image area F of a user U who is carrying an authentication medium 30 as either one of a passerby facial image or an accompanier facial image, and a facial image area F of a user U who is accompanying the user U carrying the authentication medium 30 as either one of the accompanier facial image or passerby facial image. For instance, based on the analysis result of the captured image 40, the identification unit 184 determines whether the user U carrying an authentication medium 30 is trying to solely pass through the passage zone S, or to pass through there together with another user. Upon determining that the user U carrying an authentication medium 30 is trying to solely pass through the passage zone S, the identification unit 184 determines the user U carrying an authentication medium 30 as an authorized passerby, and identifies the facial image area F of the user U carrying the authentication medium 30 as a passerby facial image. Upon determining that the user U carrying an authentication medium 30 is trying to pass through the passage zone S together with another user, the identification unit 184 determines whether the user U carrying the authentication medium 30 is an authorized passerby or an accompanier who is accompanying the authorized passerby, based on the analysis result of the captured image 40. Upon determining that the user U carrying the authentication medium 30 is an authorized passerby, the identification unit 184 identifies the facial image area F of the user U carrying the authentication medium 30 as a passerby facial image, and the facial image area F of the user U accompanying the user U carrying the authentication medium 30 as an accompanier facial image. Upon determining the user U carrying the authentication medium 30 as an accompanier, the identification unit 184 identifies the facial image area F of the user U carrying the authentication medium 30 as an accompanier facial image, and identifies the facial image area F of the user U who is accompanying the user U carrying the authentication medium 30 as a passerby facial image.

Using the captured image 40 acquired by the captured image acquisition unit 183, the identification unit 184 executes an identification process upon the facial image. As mentioned earlier, the captured image acquisition unit 183 acquires the captured image 40 at least at the time of reading the identification information at the reading unit 20. Then, the identification unit 184 executes an identification process upon a facial image, using the captured image 40 acquired by the captured image acquisition unit 183. Thus, the identification unit 184 identifies, from among one or more facial image areas F included in a captured image 40, the facial image area F of the user U who is carrying the authentication medium 30 at the time of reading identification information from this authentication medium 30 at the reading unit 20, as a passerby facial image or accompanier facial image.

The passerby facial image represents a facial image of a user U who is passing through the passage zone S and is determined as an authorized passerby. The accompanier facial image represents a facial image of a user U who is passing through the passage zone S and is accompanying the user U determined as an authorized passerby. The identification unit 184 identifies a facial image of the user U carrying an authentication medium 30 and passing through the passage zone S, as a passerby facial image or an accompanier facial image. If the user U carrying an authentication medium 30 at the time of reading identification information from the authentication medium 30 at the reading unit 20 is identified as an authorized passerby, the identification unit 184 identifies the facial image area F of the user U as a passerby facial image.

The captured image 40 captured at the time of reading identification information from the authentication medium 30 at the reading unit 20 shows a hand of the user U holding an authentication medium 30. The identification unit 184 therefore identifies the passerby facial image or accompanier facial image in the captured image 40, using the captured image 40 captured by the captured image acquisition unit 183 at least at the time of reading the identification information at the reading unit 20.

The process executed by the identification unit 184 will be described in detail below.

The identification unit 184 includes an attribute information identification unit 1841, a holding part identification unit 1842, and a facial image identification unit 1843. The facial image identification unit 1843 includes a passerby facial image identification unit 1844 and an accompanier facial image identification unit 1845.

The attribute information identification unit 1841 identifies the attribute information of a user (person) in a captured image 40. The attribute information here may include information indicating the attributes of an individual user such as his/her age, height, or clothing, and/or information indicating a relationship between users. The information indicating the attributes of an individual user may be generated as attribute recognition information by the captured image analysis unit 181.

The attribute information identification unit 1841 may identify attribute information such as the age, height, clothing, and the like, by recognizing the captured image 40. For instance, the age may be estimated by a method described in "R. Rothe, R. Timofte, and L. V. Gool, DEX: Deep Expectation of apparent age from a single image, in Proc. of ICCV, 2015", which is not a limitation. The height may be estimated from rectangles detected by a method described in "Kim, C. E., Oghaz, M. M., Fajtl, J., Argyriou, V., & Remagnino, P. (2018), A Comparison of Embedded Deep Learning Methods for Person Detection CORR". The height may be estimated based on the pose estimation information acquired by the captured image analysis unit 181. The clothing may be estimated by the method described in "M. Hadi Kiapour, Xufeng Han, Svetlana Lazebnik, Alexander C. Berg, and Tamara L. Berg., Where to Buy It: Matching Street Clothing Photos in Online Shops. In Proc. ICCV. 2015". For instance, a station staff uniform may be registered in an identification class and thereby can be used when adding an attribute.

The attribute information identification unit 1841 may identify the attribute information of the user included in the captured image 40 based on the analysis result of the captured image 40. For instance, the attribute information identification unit 1841 recognizes the presence of a user in a seated posture from the pose estimation information included in the analysis result of the captured image 40, and recognizes the presence of a wheelchair from the object recognition information included in the analysis information of the captured image 40. Based on this, the attribute information identification unit 1841 recognizes the presence of a user in a wheelchair, sets the attribute information of this user to "wheelchair", and recognizes a possibility that two users may pass together through the passage zone S. Furthermore, instead of, or in addition to, the analysis result of the captured image 40, the attribute information identification unit 1841 may identify the attribute information of the user included in the captured image 40, based on the correct facial image and/or auxiliary attribute information associated with the identification information. For instance, based on the category of the auxiliary attribute information designating "child accompanying", the attribute information identification unit 1841 may identify two users in the captured image 40 as a parent and a child, and recognize the two users passing together through the passage zone S. Moreover, the attribute information identification unit 1841 may recognize a possibility of two users passing together through the passage zone S, in response to the facial image of an accompanier registered in the correct facial image.

Figure 8:
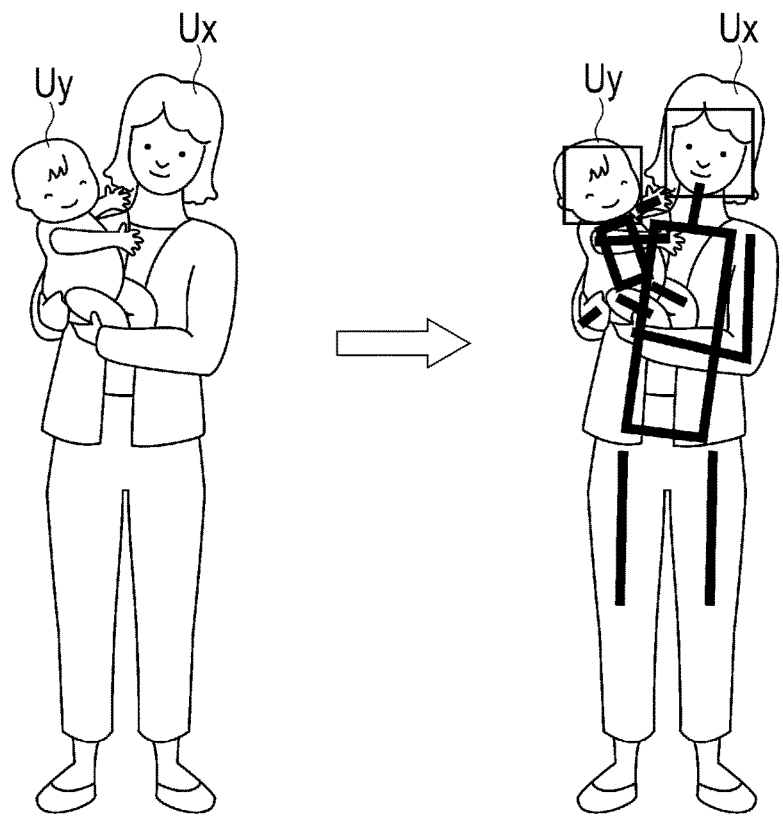
FIG. 8 is a diagram for explaining a passerby identification process.
Figure 9:
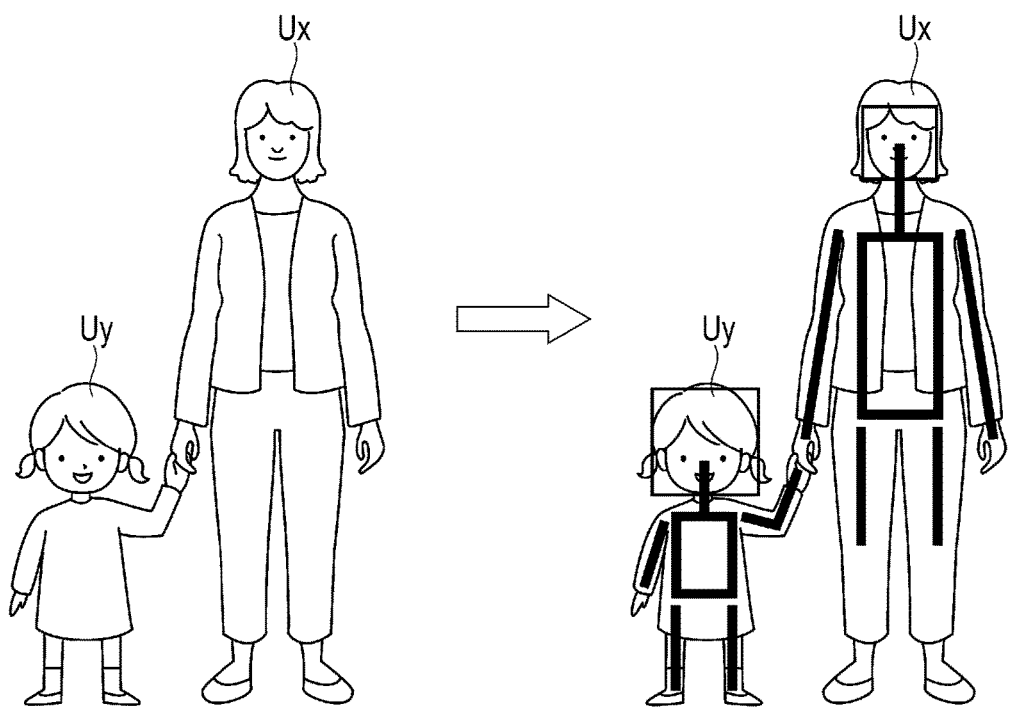
FIG. 9 is a diagram for explaining a passerby identification process.

The attribute information identification unit 1841 may generate information representing the relationship between users included in a captured image 40 based on the estimation of the posture of each user from the pose estimation information included in the analysis result of the captured image 40. For instance, the attribute information identification unit 1841 may assign an attribute from posture information such as one user carried by another user as illustrated in FIG. 8, or one user holding hands with another user as illustrated in FIG. 9. By combining the positional relationship of the users and the posture information of each of the users, the attribute information identification unit 1841 may assign an attribute of the two users to a guardian and a child.

As described above, the attribute information identification unit 1841 determines whether the user holding an authentication medium 30 is passing through the passage zone S solely or with another user. If it is determined that multiple users are passing together through the passage zone S, the attribute information identification unit 1841 reports accordingly to the facial image identification unit 1843. For instance, the attribute information identification unit 1841 may provide the facial image identification unit 1843 with information indicating that the authorized passerby is in a wheelchair or the like so that which of the facial image areas F included in the captured image 40 is the facial image of the authorized passerby can be identified.

First, a case of a user solely passing through the passage zone S will be described. In such a case, the accompanier facial image identification unit 1845 will not be activated.

The holding part identification unit 1842 identifies, from the captured image 40, which body part of the user U in the captured image 40 is holding the authentication medium 30. The passerby facial image identification unit 1844 identifies, from one or more facial image areas F included in the captured image 40, the facial image area F of the user U having the holding body part identified by the holding part identification unit 1842, as a passerby facial image.

For instance, the holding part identification unit 1842 may identify the area of the authentication medium 30 included in the captured image 40. For the identification of an area of the authentication medium 30 in the captured image 40, a known image processing technique such as pattern matching may be adopted. Further, the identification unit 184 identifies the body part of the user U overlapping or adjoining the area of the identified authentication medium 30 in the captured image 40, as a holding part P of the user U holding the authentication medium 30. The holding part P represents a body part holding the authentication medium 30 among various parts of the user U's body including arms and legs.

In particular, the holding part identification unit 1842 identifies the holding part P shown in the captured image 40, using the analysis result of the captured image 40 acquired by the captured image acquisition unit 183. As mentioned earlier, the analysis result of the captured image 40 obtained by the captured image analysis unit 181 includes pose estimation information B, and based on this pose estimation information B, the positions of the body parts of the user U shown in the captured image 40 can be identified in the captured image 40.

The identification unit 184 therefore identifies, as a holding part P, a body part overlapping or adjoining the identified area of the authentication medium 30 from among the body parts of the user U identified from the pose estimation information B on the captured image 40. It is assumed that when the user U holding an authentication medium 30 with a hand brings the authentication medium 30 into contact with or proximity to the reading unit 20, the reading unit 20 reads identification information from the authentication medium 30. Here, the identification unit 184 identifies the hand of the user U as a holding part P.

The body part of the user U carrying the authentication medium 30 is not limited to a hand. For instance, the user U may be carrying the authentication medium 30 on the wrist or in a packet of the outfit so that the identification information of the authentication medium 30 can be read by the reading unit 20. In this case, the identification unit 184 identifies the user's wrist or the user's chest where a packet is positioned, as a holding part P. In the captured image 40B of FIG. 5, the identification unit 184 identifies the user Ux's hand as a holding part P.

Among one or more facial image areas F (facial image area Fa, facial image area Fb) in the captured image 40, the passerby facial image identification unit 1844 identifies, as a passerby facial image, the facial image area F of the user U having the holding part P that has been identified as his/her body part by the holding part identification unit 1842.

Based on the positional relationship between the holding part P of the user U included in the captured image 40 based on the pose estimation information B and the face position Q of a single facial image area F or the face position Q of each of facial image areas F included in the captured image 40 based on the pose estimation information B, the passerby facial image identification unit 1844 identifies the facial image area F of the user U who has the holding part P as his/her body part, as a passerby facial image.

In the captured image 40B of FIG. 5, the passerby facial image identification unit 1844 identifies a facial image area Fa and a facial image area Fb as multiple facial image areas F included in the analysis result of the captured image 40B. The passerby facial image identification unit 1844 further identifies the face position Qa of the facial image area Fa and the face position Qb of the facial image area Fb in the captured image 40B. The face position Qa and face position Qb are examples of the face position Q of a facial image area F included in the captured image 40.

The passerby facial image identification unit 1844 identifies pose estimation information Ba and pose estimation information Bb as the pose estimation information B included in the analysis result of the captured image 40B.

Next, based on the position of the holding part P identified in the captured image 40B by the holding part identification unit 1842, the pose estimation information Ba and pose estimation information Bb, the face position Qa of the facial image area Fa, and the face position Qb of the facial image area Fb, the passerby facial image identification unit 1844 identifies the facial image area Fa of the user U, who is the same person as the user U having the holding part P, as a passerby facial image.

In particular, using the pose estimation information B, if the positional relationship of the face position Q located at the position of the head portion of the user U with the holding part P of the user U is suitable as a human body and this user U is determined as the same person as the user U having the holding part P, the passerby facial image identification unit 1844 identifies the facial image area F at the face position Q as a passerby facial image. The criteria for determining the head position of the user U who is the same person as the one having the holding part P may be prestored in the storage unit 12 in accordance with the types of the holding parts P. Using the type of the holding part P and the corresponding determination criteria, the passerby facial image identification unit 1844 identifies the facial image area F of the user U who is the same person as the one having the holding part P.

In the captured image 40B of FIG. 5, in order to identify the facial image area F of the user U who is the same person as the user Ux having the holding part P, the passerby facial image identification unit 1844 finds the facial image area Fa located at a face position Qa which has a suitable positional relationship with the holding part P as a human body and which corresponds to the head position of the same person as the user U having the holding part P. The passerby facial image identification unit 1844 identifies this identified facial image area Fa as a passerby facial image.

With the above processing, the passerby facial image identification unit 1844 selects, from the facial image area Fa and facial image area Fb included in the captured image 40B, the facial image area Fa of the user Ux carrying the authentication medium 30 at the time of reading the identification information at the reading unit 20, and identifies this facial image area Fa as a passerby facial image. In other words, in the captured image 40B, the passerby facial image identification unit 1844 identifies the facial image area Fa of the user Ux who is holding the authentication medium 30 with a hand which belongs to his/her body and serves as a holding part P, as a passerby facial image.

The description returns to FIG. 2.

The captured image acquisition unit 183 may acquire from the storage unit 12 a captured image 40 from which the identification unit 184 can estimate the holding part P of the user U at the time of reading identification information at the reading unit 20. For this purpose, the captured image 40 acquired by the captured image acquisition unit 183 may not be limited to a single one at the timing of the reading unit 20 reading the identification information.

For instance, the captured image acquisition unit 183 may acquire from the storage unit 12 multiple captured images 40 of the passage zone S that have been chronologically captured. In particular, the captured image acquisition unit 183 may acquire from the storage unit 12 a chronological series of captured images 40 that are sequential from the same imaging time as the read-out time corresponding to the identification information acquired by the identification information acquisition unit 182 to a time point in the past. Alternatively, the captured image acquisition unit 183 may acquire from the storage unit 12 a chronological series of captured images 40 that are sequential from the same imaging time as the read-out time to a time point in a direction toward the future, or a chronological series of captured images 40 that are sequential from a time point in the past to a time point in a direction toward the future including the read-out time. In this acquisition, the captured image acquisition unit 183 also acquires analysis results corresponding to the respective captured images 40 from the storage unit 12.

In the above case, the holding part identification unit 1842 of the identification unit 184 may estimate the holding part P holding the authentication medium 30 at the time of the reading unit 20 reading the identification information therefrom, based on the captured images 40 acquired by the captured image acquisition unit 183, and thereby identifies the holding part P.

For instance, the holding part identification unit 1842 identifies the holding part P in each of the captured images 40 in time series so that the movement of the holding part P can be chronologically traced. For this tracing process, a known image processing technique as disclosed in "Alex Bewley, Zongyuan Ge, Lionel Ott, Fabio Ramos, Ben Upcroft, Simple Online and Realtime Tracking, In Proc. ICIP (2016)" may be used, which is not a limitation. Using the tracing results of the movement of the holding part P, the holding part identification unit 1842 estimates the position of the holding part P at the identification information read-out time, and thereby identifies the position of the holding part P.

With the above tracking process, even if the position of the holding part P is difficult to identify from the captured image 40 at the read-out time of the reading unit 20 reading the identification information, the holding part identification unit 1842 can estimate the position of the holding part P at the identification information read-out time.

Next, the case of multiple users passing together through the passage zone S will be described. In this case, multiple facial image areas F will be extracted from a captured image 40. The operations performed commonly when a single user passes through the passage zone S and when multiple users pass together through the passage zone S will be omitted from the description.

The facial image identification unit 1843 identifies the facial image area F of a user U who is carrying an authentication medium 30 at the time of the reading unit 20 reading identification information therefrom, either as a passerby facial image or as an accompanier facial image. Among multiple facial image areas F included in the captured image 40, the passerby facial image identification unit 1844 identifies the facial image area F of a user U who is an authorized passerby, as a passerby facial image. Among multiple facial image areas F included in the captured image 40, the accompanier facial image identification unit 1845 identifies the facial image area F of a user U who accompanies the user U who is the authorized passerby, as an accompanier facial image. In the captured image 40A of FIG. 4, the facial image area Fa of the user Ux corresponding to the authorized passerby is identified as a passerby facial image, while the facial image area Fb of the user Uy who is carrying the authentication medium 30 of the user Ux is identified as an accompanier facial image. The identification process for a passerby facial image and an accompanier facial image will be described later by presenting several examples.

The authentication unit 185 will be described next.

In a solo passage of a user U through the passage zone S, the authentication unit 185 determines whether or not the passerby facial image identified by the identification unit 184 matches the correct facial image corresponding to the identification information acquired by the identification information acquisition unit 182.

The authentication unit 185 reads the correct facial image corresponding to the identification information acquired by the identification information acquisition unit 182 from the user management information 121. Then, the authentication unit 185 determines whether or not the passerby facial image identified by the identification unit 184 matches the correct facial image read from the user management information 121 (i.e. the facial image of the authorized passerby in the correct facial image). If the feature amount of the passerby facial image is the same as or similar to that of the correct facial image, the authentication unit 185 determines that the passerby facial image matches the correct facial image. For extraction of a feature amount from an image, a known image processing technique may be adopted. For determination of similarity, a threshold value of a difference between the feature amounts of a passerby facial image and a correct facial image may be defined in advance such that whether or not the passerby facial image and the correct facial image belong to the same person can be determined with reference to this threshold value. If the difference between the feature amounts is smaller than the threshold, the authentication unit 185 may determine that the passerby facial image matches the correct facial image.

Upon determination that the passerby facial image matches the correct facial image, the authentication unit 185 authenticates the user U carrying the authentication medium 30 as a passage permitted person. The user U carrying an authentication medium 30 represents a user U who carries an authentication medium 30 from which the identification information acquired by the identification information acquisition unit 182 has been read. In other words, the user U carrying an authentication medium 30 is the user U who is carrying an authentication medium 30 at the time of the reading unit 20 reading the identification information.

In contrast, if it is determined that the passerby facial image does not match the correct facial image, the authentication unit 185 determines the user U carrying the authentication medium 30 as a passage refused person. That is, if the passerby facial image does not match the correct facial image, the authentication unit 185 determines the user U carrying the authentication medium 30 at the time of the reading unit 20 reading the identification information, as a passage refused person.

The identification information acquired by the identification information acquisition unit 182 may not be registered in the user management information 121. If the identification information acquired by the identification information acquisition unit 182 is not registered in the user management information 121, the authentication unit 185 may determine the user U identified with the identification information, as a passage refused person.

The passerby facial image identification unit 1844 may not always be able to identify a passerby facial image. For instance, the user U may enter the passage zone S with his/her face covered. In this case, the captured image 40 may not show the facial image area F of the user U having the holding part P holding an authentication medium 30 as a body part. Then, the authentication unit 185 may determine the user U identified by the identification information acquired by the identification information acquisition unit 182, as a passage refused person.

In the case of multiple users Ux and Uy passing together through the passage zone S, the authentication unit 185 receives a passerby facial image and an accompanier facial image from the identification unit 184. The authentication unit 185 reads the correct facial image corresponding to the identification information acquired by the identification information acquisition unit 182 from the user management information 121. The authentication unit 185 determines whether at least one of the passerby facial image or accompanier facial image matches the correct facial image.

If the correct facial image includes a facial image of the authorized passerby only, the authentication unit 185 determines whether the passerby facial image matches the correct facial image (i.e., the facial image of the authorized passerby). If the passerby facial image matches the correct facial image, the authentication unit 185 may authenticate both the users Ux and Uy as passage permitted persons. In contrast, if the passerby facial image does not match the correct facial image, the authentication unit 185 determines both the users Ux and Uy as passage refused persons.

If the correct facial image includes a facial image of the authorized accompanier only, the authentication unit 185 determines whether the accompanier facial image matches the correct facial image (i.e., the facial image of the authorized accompanier). If the accompanier facial image matches the correct facial image, the authentication unit 185 may authenticate both the users Ux and Uy as passage permitted persons. In contrast, if the accompanier facial image does not match the correct facial image, the authentication unit 185 determines both the users Ux and Uy as passage refused persons.

If the correct facial images include both the facial image of the authorized passerby and the facial image of the authorized accompanier, the authentication unit 185 determines whether or not the passerby facial image matches the facial image of the authorized passerby, and further determines whether or not the accompanier facial image matches the facial image of the authorized accompanier in the correct facial image. If the passerby facial image matches the facial image of the authorized passerby and the accompanier facial image matches the facial image of the authorized accompanier included in the correct facial image, the authentication unit 185 authenticates the users Ux and Uy as passage permitted persons. On the other hand, if the passerby facial image and the accompanier facial image do not match the correct facial image, or in other words if the passerby facial image does not match the facial image of the authorized passerby and the accompanier facial image does not match the facial image of the authorized accompanier included in the correct facial image, the authentication unit 185 determines the users Ux and Uy as passage refused persons.

In accordance with the determination result obtained by the authentication unit 185, the passage control unit 186 controls the gate drive unit 26 provided in the passage zone S in such a manner as to permit or regulate the passage of the user U through the passage zone S.

If the determination result obtained by the authentication unit 185 indicates that the user U is authenticated as a passage permitted person, the passage control unit 186 controls the gate drive unit 26 such that the door member 28 will be switched to an open state. Under the control of the gate drive unit 26 by the passage control unit 186, the gate drive unit 26 switches the door member 28 to an open state. With the gate drive unit 26 switching the door member 28 to an open state, the user U trying to pass through the passage zone S is allowed to have a passage through the passage zone S.

If the determination result obtained by the authentication unit 185 indicates that the user U is determined as a passage refused person, the passage control unit 186 controls the gate drive unit 26 such that the door member 28 will be in a closed state. Under the control of the gate drive unit 26 by the passage control unit 186, the gate drive unit 26 switches the door member 28 to a closed state. With the gate drive unit 26 switching the door member 28 to a closed state, the passage of the user U trying to pass through the passage zone S is regulated.

The output control unit 187 outputs the determination result obtained by the authentication unit 185. For instance, the output control unit 187 may display the determination result obtained by the authentication unit 185 on the UI unit 14. The output control unit 187 may transmit the determination result obtained by the authentication unit 185 to an external information processing apparatus via the communication unit 16. Furthermore, the output control unit 187 may output the determination result obtained by the authentication unit 185 to an output mechanism provided in the gate device 24. The output mechanism may be a display device for displaying images, a speaker for outputting sounds, or a lamp for issuing a light beam, but the output mechanism is not limited thereto.

The process for identifying a passerby facial image and an accompanier facial image will be explained. It is assumed here that the user Ux is an authorized passerby, and the user Uy is an accompanier.

In the example of FIG. 1, the user Ux is in a wheelchair, and the user Uy who is assisting the user Ux touches the reading unit 20 with the authentication medium 30 on behalf of the user Ux. In this example, the correct facial image corresponding to the identification information "UxID" includes the facial image of the user Ux registered as the facial image of an authorized passerby and the facial image of the user Uy registered as the facial image of an authorized accompanier.

Since it is the user Uy who touches the reading unit 20 with the authentication medium 30, the identification unit 184 identifies the hand of the user Uy as a holding part, and thereby identifies the user Uy as a candidate authorized passerby. The identification unit 184 compares the facial image of the user Uy extracted from the captured image 40 with the correct facial image, and recognizes that the facial image of the user Uy matches the facial image of the authorized accompanier included in the correct facial image. Thus, the identification unit 184 determines the user Uy as an accompanier. Upon detection of a facial image area below the facial image area of the user Uy, who has been determined as an accompanier, from the captured image 40, or upon detection of a wheelchair from the captured image 40, the identification unit 184 recognizes that the authorized passerby is in a wheelchair, and determines the user Ux as an authorized passerby.

In this manner, the identification unit 184 determines the user Ux as an authorized passerby and the user Uy as an accompanier, and extracts the facial image area of the user Ux as a passerby facial image and the facial image area of the user Uy as an accompanier facial image from the captured image 40.

Thereafter, the authentication unit 185 recognizes that the passerby facial image matches the facial image of the authorized passerby included in the correct facial image and that the accompanier facial image matches the facial image of the authorized accompanier included in the correct facial image, and allows the passage of the users Ux and Uy. In this example, the accompanier facial image matching the facial image of the authorized accompanier has been recognized by the identification unit 184, and the authentication unit 185 therefore receives from the identification unit 184 the information that the accompanier facial image matches the facial image of the authorized accompanier.

Figure 6:
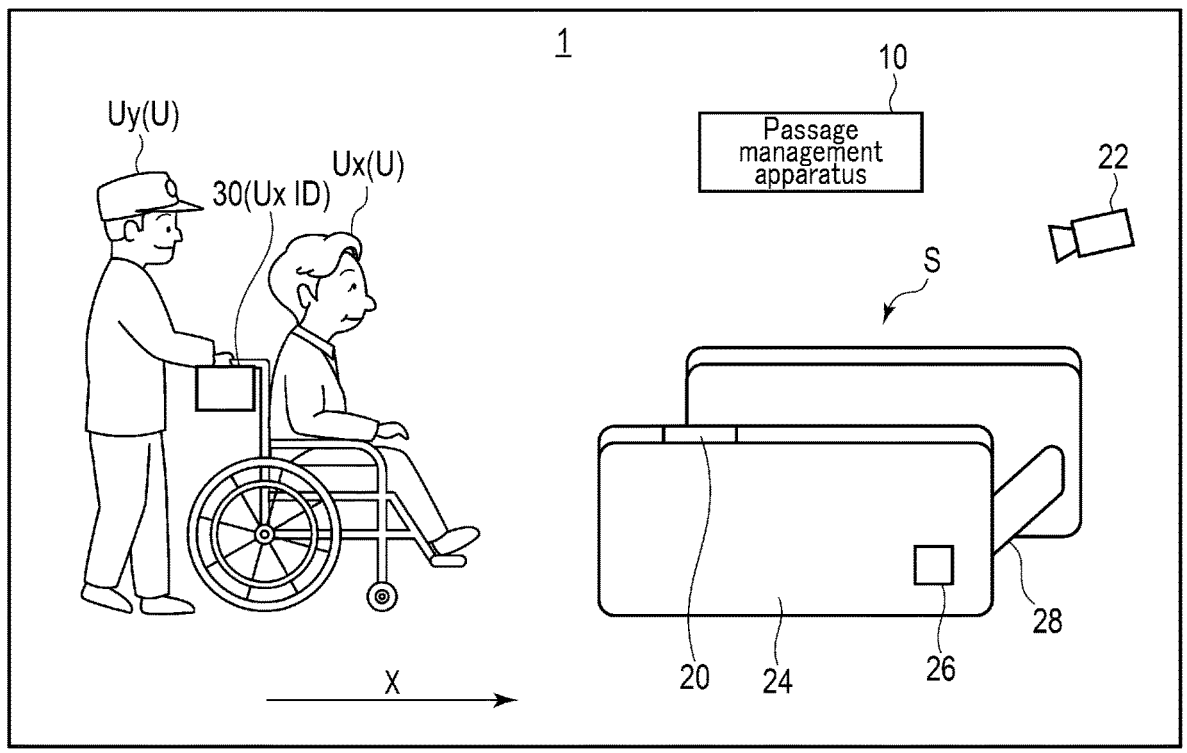
FIG. 6 is a diagram for explaining a passerby identification process.

In the example of FIG. 6, the user Uy is a facility management worker (e.g., station worker), and touches the reading unit 20 with an authentication medium 30 of the user Ux in a wheelchair on behalf of this user. The facility management worker may accompany any authorized passerby, and therefore is registered in advance as a general accompanier who is allowed to pass through the passage zone S together with any authorized passerby. The facial image of this facility management worker is stored in the storage unit 12 as a facial image of the general accompanier.

In the correct facial image corresponding to the identification information "UxID", the facial image of only the authorized passerby (i.e. user Ux) may be registered, or the facial images of both the authorized passerby and the authorized accompanier may be registered.

Since it is the user Uy who touches the reading unit 20 with the authentication medium 30, the identification unit 184 identifies the hand of the user Uy as a holding part, and thereby identifies the user Uy as a candidate authorized passerby. The identification unit 184 compares the facial image of the user Uy extracted from the captured image 40 with the correct facial image, and recognizes that the facial image of the user Uy does not match the correct facial image. Then, the identification unit 184 compares the facial image of the user Uy with the facial image of the general accompanier, and recognizes that the facial image of the user Uy matches the facial image of the general accompanier. The identification unit 184 therefore determines the user Uy as an accompanier. Upon detection of a facial image area below the facial image area of the user Uy who has been determined as an accompanier, or upon detection of a wheelchair from the captured image 40, the identification unit 184 recognizes that the authorized passerby is in a wheelchair, and determines the user Ux as an authorized passerby.

In this manner, the identification unit 184 determines the user Ux as an authorized passerby and the user Uy as an accompanier, and extracts the facial image area of the user Ux as a passerby facial image and the facial image area of the user Uy as an accompanier facial image from the captured image 40.

Thereafter, the authentication unit 185 recognizes that the passerby facial image matches the facial image of the authorized passerby included in the correct facial image and that the accompanier facial image matches the facial image of the general accompanier, and allows the passage of the users Ux and Uy. In this example, the accompanier facial image matching the facial image of the general accompanier has been recognized by the identification unit 184, and the authentication unit 185 therefore receives from the identification unit 184 the information that the accompanier facial image matches the facial image of the general accompanier.

In the above case, if the facial image of a facility management worker is not registered, the identification unit 184 identifies the attribute information of the user Uy accompanying the user Ux who has been determined as an authorized accompanier. For instance, the identification unit 184 may make an estimate on the clothing of the user Uy from the captured image 40, and based on this clothing estimate result, set the attribute information of the user Uy to the facility management worker. If this is the case, in response to the passerby facial image matching the facial image of the authorized passerby in the correct facial image and the attribute information of the accompanier matching a facility management worker, the authentication unit 185 allows the passage of the users Ux and Uy.

Figure 7:
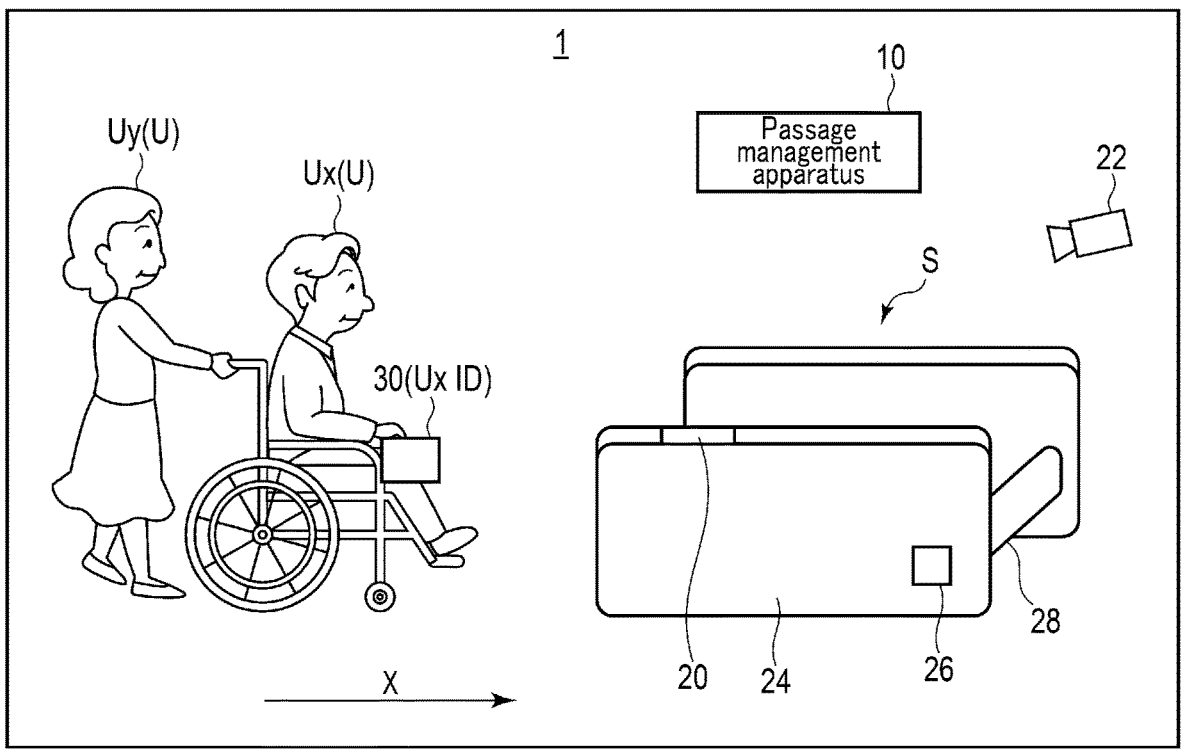
FIG. 7 is a diagram for explaining a passerby identification process.

In the example of FIG. 7, the user Uy is assisting the user Ux in a wheelchair, and the user Ux is going to touch the reading unit 20 with his authentication medium 30 by himself. In this example, the facial image of the user Ux is registered as the facial image of an authorized passerby, and the facial image of the user Uy is registered as the facial image of an authorized accompanier in the correct facial image corresponding to the identification information "UxID".

Since it is the user Ux who touches the reading unit 20 with the authentication medium 30, the identification unit 184 identifies the hand of the user Ux as a holding part, and thereby identifies the user Ux as a candidate authorized passerby. The identification unit 184 compares the facial image of the user Ux extracted from the captured image 40 with the correct facial image, and recognizes that the facial image of the user Ux matches the facial image of the authorized passerby included in the correct facial image. Thus, the identification unit 184 determines the user Ux as an authorized passerby. The identification unit 184 further recognizes, based on a facial image of an authorized accompanier included in the correct facial image, a possibility of the presence of another user accompanying the user Ux. Based on the pose estimation information extracted from the captured image 40 and a wheelchair detected in this captured image 40, the identification unit 184 recognizes that the user Ux is in a wheelchair. In a case where an authorized passerby is in a wheelchair and an accompanier is accompanying the authorized passerby, the captured image 40 will show a facial image area corresponding to the accompanier above a facial image area corresponding to the authorized passerby. Thus, the identification unit 184 extracts the facial image area located above the facial image area of the user Ux as a facial image of a candidate accompanier from the captured image 40, and recognizes that the facial image of this candidate accompanier matches the facial image of the accompanier included in the correct facial image. The identification unit 184 thereby determines the user Uy as an accompanier.

In this manner, the identification unit 184 determines the user Ux as an authorized passerby and the user Uy as an accompanier, and extracts the facial image area of the user Ux as a passerby facial image and the facial image area of the user Uy as an accompanier facial image from the captured image 40.

Thereafter, the authentication unit 185 recognizes that the passerby facial image matches the facial image of the authorized passerby included in the correct facial image and that the accompanier facial image matches the facial image of the authorized accompanier included in the correct facial image, and allows the passage of the users Ux and Uy. In this example, the passerby facial image matching the facial image of the authorized passerby and the accompanier facial image matching the facial image of the authorized accompanier have been identified by the identification unit 184, and the authentication unit 185 therefore receives from the identification unit 184 the information that the passerby facial image and accompanier facial image match the correct facial image.

The identification process described with reference to FIG. 7 is applicable to the case where the users Ux and Uy are a parent and a child. For instance, the user Ux is a parent of the user Uy, who is a small child with no fare required for a public transportation ride. When the users Ux and Uy are passing through the passage zone S, it is assumed that the user Uy may be carried by the user Ux as illustrated in FIG. 8, the users Ux and Uy are holding hands as illustrated in FIG. 9, or the user Uy may be in a baby stroller. By registering the facial image of the user Ux and the facial image of the user Uy in the correct facial image, a permission can be readily obtained for the passage of the users Ux and Uy together, making the entire passage orderly.

In the case where the users Ux and Uy are a parent and a child as in FIGS. 8 and 9, the facial image of the authorized accompanier (user Uy) may not always need to be registered in the correct facial image. If the correct facial image includes only the facial image of the authorized passerby (user Ux), the authentication unit 185 allows the passage of the users Ux and Uy upon the attachment of an attribute such as "small child" to the user Uy at the identification unit 184. This attribute may be identified based on an estimated age or height, the posture information, or a detection of a baby stroller.

In particular, since the user Ux herself touches the reading unit 20 with her own authentication medium 30, the identification unit 184 identifies the user Ux as a candidate authorized passerby. The identification unit 184 compares the facial image of the user Ux extracted from the captured image 40 with the correct facial image, and recognizes that the facial image of the user Ux matches the facial image of the authorized passerby included in the correct facial image. Thus, the identification unit 184 determines the user Ux as an authorized passerby.

Based on the positional relationship between the facial image area corresponding to the user Ux and the facial image area corresponding to the user Uy, or based on the attribute information of the users Ux and Uy identified from the captured image 40, the identification unit 184 determines the user Uy as an accompanier. Since the attribute information of the user Uy indicates "child", the authentication unit 185 authenticates the users Ux and Uy as passage permitted persons.

As described above, even if the facial image of the user Uy determined as an accompanier does not match the correct facial image, the authentication unit 185 authenticates the users Ux and Uy as passage permitted persons upon a determination that the facial image of the user Ux determined as an authorized passerby matches the correct facial image and also that the attribute information of the user Uy matches a predetermined attribute such as "child". If the attribute information of the user Uy does not match any of the predetermined attributes, the authentication unit 185 determines the users Ux and Uy as passage refused persons.

The above process is also applicable to the case where a station worker accompanies a visually impaired user through the passage zone S.

Figure 10:
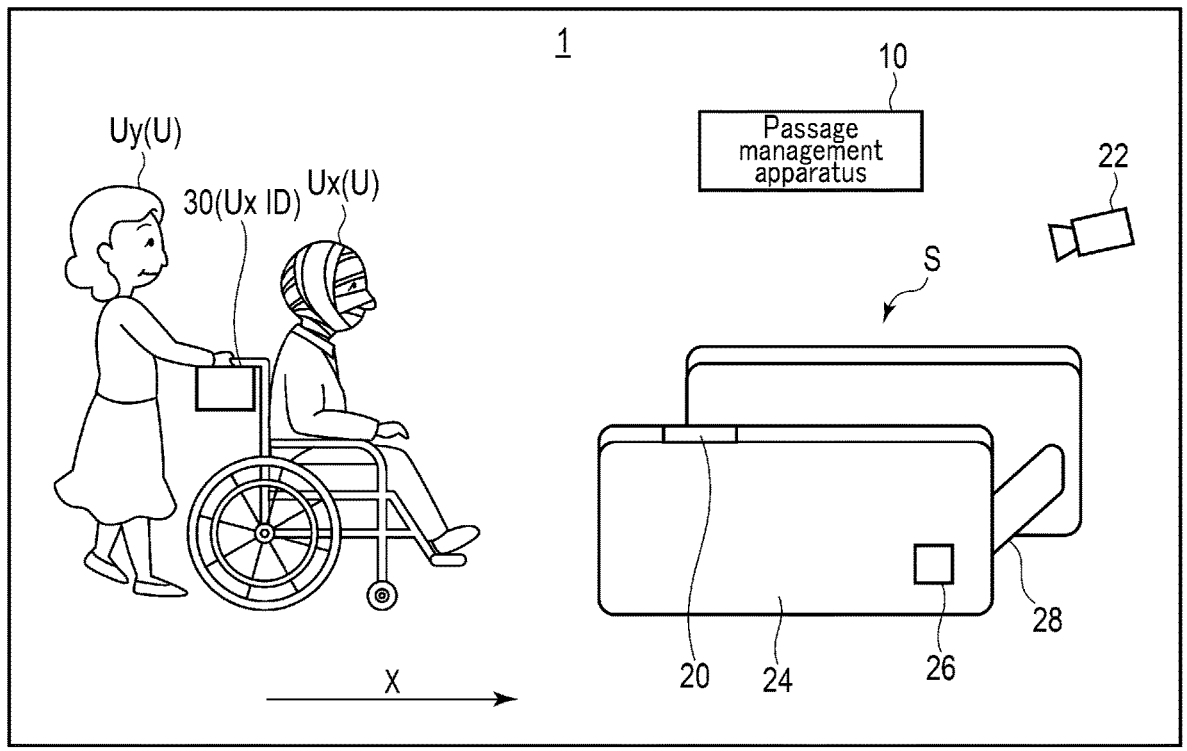
FIG. 10 is a diagram for explaining a passerby identification process.

The case where the face of the user Ux is difficult to recognize, such as the face of a user Ux that is heavily bandaged, will be described with reference to FIG. 10. In this case, the facial image of the user Ux is not registered in the correct facial image corresponding to the identification information "UxID", and the facial image of the user Uy is registered as the facial image of an authorized accompanier. If the attribute of the user Ux matches a predetermined attribute and the facial image of the user Uy matches the facial image of the authorized accompanier, the authentication unit 185 gives passage permission to the users Ux and Uy.

In particular, upon the user Uy touching the reading unit 20 with the authentication medium 30 of the user Ux on behalf of the user Ux, the identification unit 184 identifies the user Uy as a candidate authorized passerby. The identification unit 184 determines whether or not the facial image of the user Uy matches the correct facial image. Based on the facial image of the user Uy matching the facial image of the authorized accompanier included in the correct facial image, the identification unit 184 determines the user Uy as an accompanier. Furthermore, upon detection of a facial image area below the facial image area of the user Uy determined as an accompanier, or detection of a wheelchair from the captured image 40, the identification unit 184 recognizes that the authorized passerby is in a wheelchair, and thereby determines the user Ux as an authorized passerby.

If the auxiliary attribute information corresponding to the identification information "UxID" includes information designating a category "substitute passerby", the identification unit 184 recognizes that the attribute of the user Ux indicates an exceptional case where the face recognition of the authorized passerby is not possible to carry out. The authentication unit 185 therefore makes a determination on a passage permission based on the facial recognition result of the user Uy. Alternatively, the identification unit 184 may be configured to recognize that the attribute of the user Ux is an exceptional case, based on the content of the facial image area of the user Ux.

As described above, the authentication unit 185 authenticates the users Ux and Uy as passage permitted persons if the passerby facial image and the accompanier facial image both match the correct facial image corresponding to the identification information; if the passerby facial image matches the correct facial image corresponding to the identification information, and the attribute of the user determined as an accompanier matches any of the predetermined attributes; or if the accompanier facial image matches the correct facial image corresponding to the identification information, and the attribute of the user determined as an authorized passerby matches any of the predetermined attributes.

Next, the operation of the passage management apparatus 10 according to the present embodiment will be explained. The exemplary case where the user Uy assisting the user Ux in a wheelchair is touching the reading unit 20 with the authentication medium 30 of the user Ux on behalf of the user Ux as illustrated in FIG. 1 will be discussed.

Figure 11B:
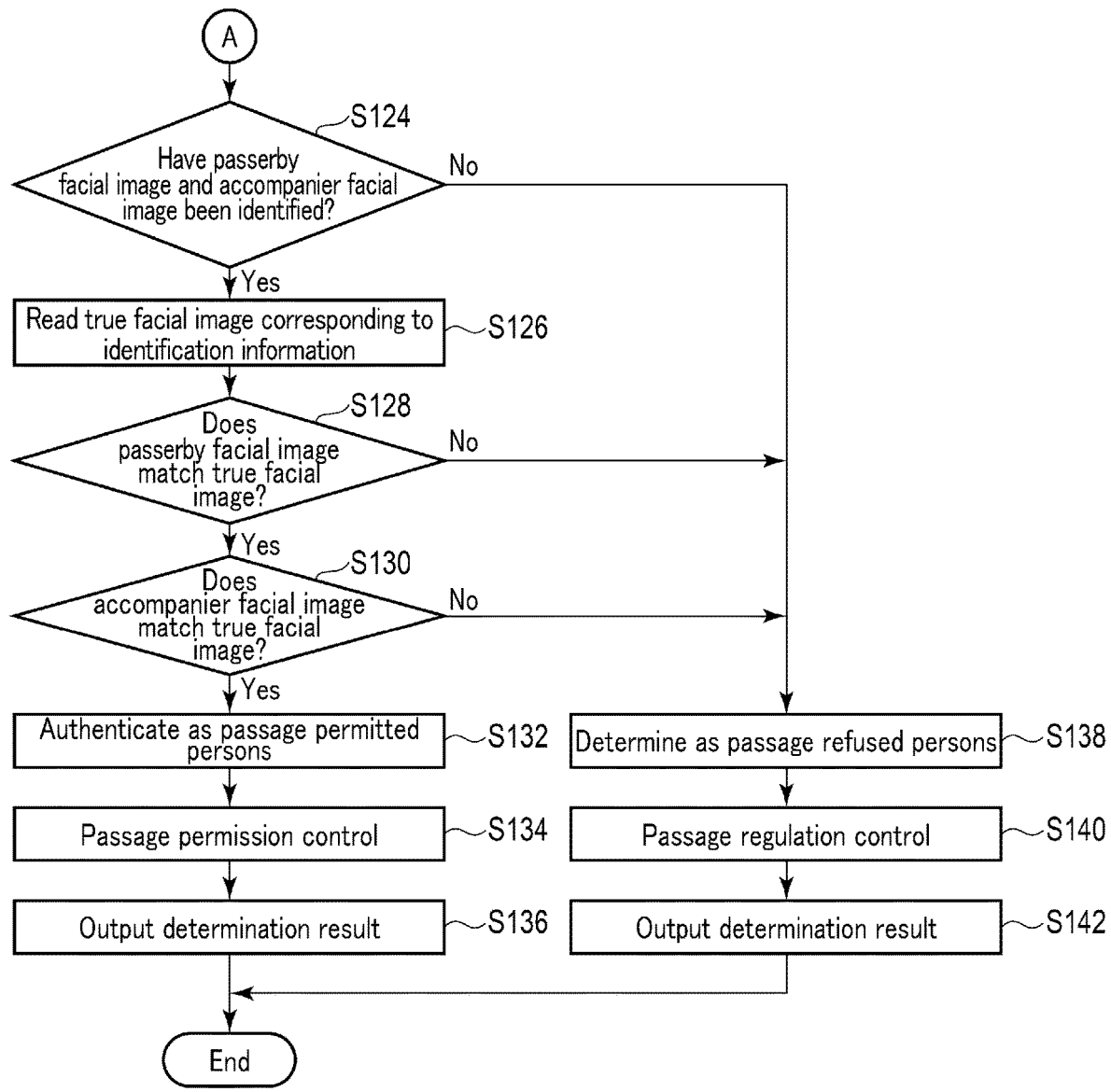
FIG. 11B is a flowchart showing the procedure of the passage management process implemented by the passage management apparatus of FIG. 2.

FIGS. 11A and 11B schematically show an exemplary flow of the information processing executed by the passage management apparatus 10 according to the present embodiment.

At step S102 of FIG. 11A, the captured image analysis unit 181 receives a captured image 40 from the imaging unit 22. At step S104, the captured image analysis unit 181 analyzes the captured image 40 received at step S102 to generate an analysis result. At step S106, the captured image analysis unit 181 associates the captured image 40 received at step S102, the analysis result obtained at step S104, and the imaging time of the captured image 40 with each other and stores them in the storage unit 12. The analysis result of the captured image 40 includes a facial image area, pose estimation information, attribute recognition information, and object recognition information. If there are multiple persons or objects, the analysis result of the captured image 40 includes the information on each of the persons or objects.

Since the captured image analysis unit 181 analyzes the captured image 40, the processing time required from reading of the identification information from the authentication medium 30 to the outputting of the determination results can be reduced, in comparison with a structure in which the identification unit 184 is configured to analyze a captured image 40 to obtain the analysis results and then execute an identification process.

At step S108, the identification information acquisition unit 182 determines whether identification information is received from the reading unit 20. If the identification information acquisition unit 182 receives no identification information from the reading unit 20 (no at step S108), the process returns to step S102, and the sequence of operations at steps S102, S104, and S106 is repeated. If the identification information acquisition unit 182 receives identification information from the reading unit 20 (yes at step S108), the process proceeds to step S110.

At step S110, the authentication unit 185 determines whether the identification information obtained at step S108 is registered in the user management information 121. If the authentication unit 185 determines that it is not registered (no at step S110), the process proceeds to step S144. At step S144, the authentication unit 185 determines the users U (users Ux and Uy) trying to pass through the passage zone S, as passage refused persons. At step S146, the passage control unit 186 controls the gate drive unit 26 such that the passage of the users U through the passage zone S is regulated. At step S148, the output control unit 187 outputs a determination result indicating passage refused. Then, this processing flow is completed.

On the other hand, if the authentication unit 185 determines that the identification information obtained at step S108 has been registered (yes at step S110), the process proceeds to step S112. At step S112, the captured image acquisition unit 183 acquires a captured image 40 of the passage zone S. For instance, the captured image acquisition unit 183 acquires a captured image 40 having an imaging time that matches the read-out time of reading the identification information at step S108, from among the captured images 40 analyzed by the captured image analysis unit 181.

At step S114, the identification unit 184 acquires from the user management information 121 the auxiliary attribute information corresponding to the identification information acquired at step S108. The auxiliary attribute information is used for selecting a suitable downstream process. Here, the processing performed when no auxiliary attribute information is associated with the identification information acquired at step S108 will be described.

At step S116, the holding part identification unit 1842 identifies, from the captured image 40 acquired at step S112, the holding part P holding the authentication medium 30 in the user U's body shown on the captured image 40. In the present case, the hand of the user Uy is identified as a holding part.

At step S118, the attribute information identification unit 1841 generates attribute information of the persons and objects included in the captured image 40 acquired at step S110. The attribute information is used for identification of the facial images. If auxiliary attribute information is included, the attribute information is generated by taking this auxiliary attribute information into account as well. As attribute information in this case, the attribute information identification unit 1841 obtains, from the pose estimation information and/or attribute recognition information included in the analysis results, information that a user in a seated posture is present, and also obtains, from the object recognition information included in the analysis result, information that a wheelchair is present. The attribute information identification unit 1841 further recognizes, based on the information that the facial image of an accompanier is registered in the correct facial image, a possibility that two people may be passing together through the passage zone S. Here, the attribute information identification unit 1841 conveys information that helps identify the passerby and accompanier based on the positions of the facial images to the facial image identification unit 1843.

At step S120, the passerby facial image identification unit 1844 identifies the facial image area of the user Ux who corresponds to the authorized passerby, as a passerby facial image, from among one or more facial image areas included in the captured image 40 acquired at step S110. In the present case, the passerby facial image identification unit 1844 identifies, from the information obtained from the attribute information identification unit 1841, the user Ux in a wheelchair as an authorized passerby and the facial image area of this user Ux as a passerby facial image.

At step S122, the accompanier facial image identification unit 1845 identifies from one or more facial image areas F included in the captured image 40 obtained at step S110, the facial image area of the user Uy accompanying the authorized passerby as an accompanier facial image. In the present case, the accompanier facial image identification unit 1845 identifies as an accompanier the user Uy having the holding part identified at step S118 as his/her body part, based on the information acquired from the attribute information identification unit 1841, and identifies the facial image area of the user Uy as an accompanier facial image.

At step S124 of FIG. 11B, the authentication unit 185 determines whether or not the identification of the facial image is successful. In the present case, the authentication unit 185 determines whether or not the passerby facial image identification unit 1844 has identified a passerby facial image at step S120, and whether or not the accompanier facial image identification unit 1845 has identified an accompanier facial image at step S122. If the passerby facial image identification unit 1844 has identified a passerby facial image and the accompanier facial image identification unit 1845 has identified an accompanier facial image, the authentication unit 185 determines that the identification of the facial image is successful. If not, the authentication unit 185 determines that the identification of the facial image has failed. Upon the authentication unit 185 determining that the identification of a facial image is successful, the process proceeds to step S126. Upon the authentication unit 185 determining that the identification of the facial image has failed, the process proceeds to step S138.

At step S126, the authentication unit 185 reads from the storage unit 12 the correct facial image corresponding to the identification information obtained at step S108.

At step S128, whether the passerby facial image identified at step S120 matches the correct facial image is determined. If the authentication unit 185 determines that the passerby facial image matches the correct facial image (yes at step S128), the process proceeds to step S130.

At step S130, the authentication unit 185 determines whether the accompanier facial image identified at step S122 matches the correct facial image. If the authentication unit 185 determines that the accompanier facial image matches the correct facial image (yes at step S130), the process proceeds to step S132.

At step S132, the authentication unit 185 authenticates the user Uy carrying an authentication medium 30 in which the identification information obtained at step S106 is stored and the accompanying user Ux as passage permitted persons.

At step S134, the passage control unit 186 controls the gate drive unit 26 provided in the passage zone S such that the passage of the user Ux and user Uy through the passage zone S is permitted. At step S136, the output control unit 187 outputs the determination result indicating the passage permission. With this operation, the processing flow is completed.

On the other hand, at step S128 or S130, if the authentication unit 185 determines that matching is not achieved (no at step S128 or S130), the process proceeds to step S138.

At step S138, the authentication unit 185 determines the users Ux and Uy as passage refused persons. With the operation at step S128, the authentication unit 185 determines the user Uy who carries the authentication medium 30 in which the identification information obtained at step S106 is stored at the time of the reading unit 20 reading the identification information, and the accompanying user Ux, as passage refused persons.

At step S140, the passage control unit 186 controls the gate drive unit 26 provided in the passage zone S such that the passage of the user Ux and user Uy through the passage zone S is regulated. At step S142, the output control unit 187 outputs a recognition result indicating passage refused. With this operation, the processing flow is completed.

The procedure shown in FIGS. 11A and 11B is a mere example. The procedure of the passage management process according to the present embodiment is not limited to FIGS. 11A and 11B. For instance, after the authentication unit 185 determines at step S128 that the passerby facial image matches the correct facial image when the correct facial image does not include the facial image of an authorized accompanier, the process may proceed to a step at which the authentication unit 185 determines whether the attribute information of the user Uy matches any of the predetermined attributes. If the attribute information of the user Uy matches any of the predetermined attributes, the process proceeds to step S132. If the attribute information of the user Uy does not match any of the predetermined attributes, the process proceeds to step S138. In the case where the facial image of a general accompanier such as a station worker is registered, if the authentication unit 185 determines at step S130 that the accompanier facial image does not match the correct facial image, the process may proceed to a step at which it is determined whether the accompanier facial image matches the facial image of a general accompanier. If the authentication unit 185 determines that the accompanier facial image matches the facial image of a general accompanier, the process proceeds to step S132, where the authentication unit 185 authenticates the users Ux and Uy as passage permitted persons. If the authentication unit 185 determines that the accompanier facial image does not match the facial image of a general accompanier, the process proceeds to step S138, where the authentication unit 185 determines the users Ux and Uy as passage refused persons.

As described above, the passage management apparatus 10 includes an identification information acquisition unit 182, a captured image acquisition unit 183, an identification unit 184, and an authentication unit 185. The identification information acquisition unit 182 obtains the identification information read from an authentication medium 30 at the reading unit 20 provided in the passage zone S. The captured image acquisition unit 183 obtains an image 40 from captured images of the passage zone S.

If one user carrying an authentication medium 30 is passing through the passage zone S with another user, the identification unit 184 identifies, from among multiple facial image areas included in the image 40, the facial image area of the first user, who is the user carrying an authentication medium 30, as either one of the passerby facial image or accompanier facial image, and identifies, from among the multiple facial image areas included in the image 40, the facial image area of the second user, who is accompanying the first user, as the other one of the passerby facial image or accompanier facial image. For instance, the identification unit 184 determines which of the first user and second user is an authorized passerby. If the first user is determined as an authorized passerby, the identification unit 184 identifies the facial image area of the first user as a passerby facial image, and the facial image area of the second user as an accompanier facial image. If the second user is determined as an authorized passerby, the identification unit 184 identifies the facial image area of the second user as a passerby facial image, and the facial image area of the first user as an accompanier facial image.

If at least one of the passerby facial image and accompanier facial image matches the correct facial image corresponding to the identification information, the authentication unit 185 authenticates the first user and second user as passage permitted persons. If neither the passerby facial image nor the accompanier facial image matches the correct facial image, the authentication unit 185 determines the first user and second user as passage refused persons.

If either one of the facial image of the first user carrying an authentication medium 30 and the facial image of the second user accompanying the first user matches the correct facial image, both the first user and second user are authenticated as passage permitted persons. As a result, even if a user identified by the identification information stored in the authentication medium 30 is accompanied by another user who is carrying the authentication medium 30 on behalf of the medium owning user, the passage of both users through the passage zone S is permitted. The passage management apparatus 10 therefore enhances passage-relating security, and also enhances convenience.

In the case where the correct facial image includes the facial image of an authorized passerby and the facial image of an authorized accompanier, the authentication unit 185 authenticates the first user and second user as passage permitted persons if the passerby facial image matches the facial image of the authorized passerby and the accompanier facial image matches the facial image of the authorized accompanier.

If the correct facial image includes the facial image of an authorized passerby, the authentication unit 185 authenticates the first user and second user as passage permitted persons if the passerby facial image matches the facial image of the authorized passerby, and the accompanier facial image matches the facial image of a general accompanier who has been registered and permitted to pass through the passage zone.

The identification unit 184 identifies the attribute information of multiple users included in a captured image 40, and determines whether or not the first user is an authorized passerby based on the identified attribute information. In the case where the correct facial image includes the facial image of an authorized passerby, the authentication unit 185 authenticates the first user and second user as passage permitted persons if the passerby facial image matches the facial image of the authorized passerby and if the attribute information of one of the first user and second user who is not an authorized passerby matches a predetermined attribute. In the case where the correct facial image includes the facial image of an authorized accompanier, the authentication unit 185 authenticates the first user and second user as passage permitted persons if the accompanier facial image matches the facial image of the authorized accompanier and if the attribute information of one of the first user and second user who is an authorized passerby matches a predetermined attribute.

An authentication using facial images and/or attribute information is performed on the first user carrying an authentication medium 30 and the second user accompanying the first user. This enhances passage-relating security.

FIG. 12 schematically shows an exemplary hardware structure of a computer 1200 implementing the passage management apparatus 10. As illustrated in this drawing, the computer 1200 includes, as hardware structural elements, a CPU 1201, a random access memory (RAM) 1202, an auxiliary storage device 1203, an input/output interface 1204, and a communication interface 1205. The CPU 1201 is connected to the RAM 1202, auxiliary storage device 1203, input/output interface 1204, and communication interface 1205 via a bus 1206 in a communicable manner.

The CPU 1201 is a general-purpose processor that can implement programs. The RAM 1202 may include a volatile memory such as a synchronous dynamic random access memory (SDRAM), and is used as a work area of the CPU 1201. The auxiliary storage device 1203 includes a nonvolatile memory such as a hard disk drive (HDD) or a solid state drive (SSD), and stores programs including a passage management program and various types of data.

The CPU 1201 operates in accordance with a program stored in the auxiliary storage device 1203. The passage management program, when implemented by the CPU 1201, causes the CPU 1201 to perform the process that has been described with regard to the passage management apparatus 10. The CPU 1201 functions as a control unit 18 included in the passage management apparatus 10 in accordance with the passage management program. In particular, the CPU 1201 functions as the captured image analysis unit 181, identification information acquisition unit 182, captured image acquisition unit 183, identification unit 184, authentication unit 185, passage control unit 186, and output control unit 187, in accordance with the passage management program. The auxiliary storage device 1203 functions as the storage unit 12 illustrated in FIG. 2.

The input/output interface 1204 includes an interface that connects an input device to an output device. The input device allows a system user to input information, examples of which include a keyboard and a mouse. The output device outputs information, examples of which include a display device and a speaker. The input/output interface 1204, input device, and output device function as the UI unit 14 in FIG. 2.

The communication interface 1205 is an interface that establishes communications with an information processing apparatus provided outside the computer 1200. For instance, the CPU 1201 receives identification information from a reading unit 20 via the communication interface 1205. The CPU 1201 receives captured images 40 from the imaging unit 22 via the communication interface 1205. The CPU 1201 also controls the gate drive unit 26 via the communication interface 1205. The communication interface 1205 functions as the communication unit 16 in FIG. 2.

In place of, or in addition to, the general-purpose processor, the computer 1200 may include a special-purpose processor such as a field programmable gate array (FPGA) or application specific integrated circuit (ASIC). The processing circuitry represents a general-purpose processor, a special-purpose processor, or a combination thereof. The processing circuitry is configured to operate as the control unit 18 of the passage management apparatus 10.

Programs including the passage management program may be provided in the computer 1200 in a form of being stored in a computer-readable storage medium. If this is the case, the computer 1200 includes a drive for reading data from the storage medium to obtain the programs from the storage medium. Examples of the storage medium include a magnetic disk, an optical disk (e.g., CD-ROM, CD-R, DVD-ROM, and DVD-R), a magnetooptical disk (e.g., MO), and a semiconductor memory. Alternatively, the programs may be distributed through a communication network. In particular, a program may be stored in a server on the communication network so that the computer 1200 can download the program from the server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory computer readable medium including computer executable instructions, wherein the instructions, when executed by a processor, cause the processor to perform a method comprising:
   acquiring identification information read from an authentication medium by a reading unit installed in a passage zone, the authentication medium including a storage medium storing the identification information;
   acquiring a captured image of the passage zone;
   identifying, from multiple facial image areas included in the captured image, a passerby facial image and an accompanier facial image, wherein a facial image area of a first user, who carries the authentication medium, is identified as either one of the passerby facial image and the accompanier facial image, and a facial image area of a second user, who accompanies the first user, is identified as the other one of the passerby facial image and the accompanier facial image; and
   authenticating the first user and the second user as passage permitted persons if at least one of the passerby facial image and the accompanier facial image matches a correct facial image registered in association with the identification information, wherein auxiliary attribute information representing information regarding a mode of a passage of a passerby is associated with the identification information.

2. The non-transitory computer readable medium according to claim 1, wherein
   at the authenticating, the first user and the second user are determined as passage refused persons if neither the passerby facial image nor the accompanier facial image matches the correct facial image.

3. The non-transitory computer readable medium according to claim 1, wherein
   the correct facial image registered in association with the identification information includes a facial image of an authorized passerby identified by the identification information and a facial image of an authorized accompanier permitted to pass through the passage zone together with the authorized passerby, and
   at the authenticating, the first user and the second user are authenticated as passage permitted persons if the passerby facial image matches the facial image of the authorized passerby and if the accompanier facial image matches the facial image of the authorized accompanier.

4. The non-transitory computer readable medium according to claim 1, wherein
   the correct facial image registered in association with the identification information includes a facial image of an authorized passerby identified by the identification information, and
   at the authenticating, the first user and the second user are authenticated as passage permitted persons if the passerby facial image matches the facial image of the authorized passerby and if the accompanier facial image matches a facial image of a pre-registered general accompanier who is permitted to pass through the passage zone.

5. The non-transitory computer readable medium according to claim 1, wherein the identifying comprises:
   identifying attribute information of a plurality of users included in the captured image; and
   determining, based on the identified attribute information, whether or not the first user is an authorized passerby identified by the identification information.

6. The non-transitory computer readable medium according to claim 5, wherein
   the correct facial image registered in association with the identification information includes a facial image of the authorized passerby, and
   at the authenticating, the first user and the second user are authenticated as passage permitted persons if the passerby facial image matches the facial image of the authorized passerby and if the identified attribute information of either one of the first user and the second user who is not the authorized passerby matches a predetermined attribute.

7. The non-transitory computer readable medium according to claim 5, wherein
   the correct facial image registered in association with the identification information includes a facial image of an authorized accompanier permitted to pass through the passage zone together with the authorized passerby, and
   at the authenticating, the first user and the second user are authenticated as passage permitted persons if the accompanier facial image matches the facial image of the authorized accompanier and if the identified attribute information of either one of the first user and the second user who is the authorized passerby matches a predetermined attribute.

8. The non-transitory computer readable medium according to claim 1, wherein
   at the identifying, a user carrying the authentication medium at a time of reading the identification information from the authentication medium at the reading unit is identified as the first user from a plurality of users included in the captured image.

9. The non-transitory computer readable medium according to claim 1, wherein
   at the identifying, a user who is allowed to pass through the passage zone together with the first user is identified as the second user from a plurality of users included in the captured image.

10. The non-transitory computer readable medium according to claim 1, wherein
    at the acquiring the captured image, the captured image at least at a time of reading the identification information at the reading unit is acquired.

11. The non-transitory computer readable medium according to claim 1, wherein
    the method further comprises outputting an authentication result obtained at the authenticating.

12. The non-transitory computer readable medium according to claim 1, wherein
    the method further comprises controlling a gate drive unit provided in the passage zone in accordance with an authentication result obtained at the authenticating in such a manner that a passage of the user through the passage zone is permitted or regulated.

13. A non-transitory computer readable medium including computer executable instructions, wherein the instructions. when executed by a processor, cause the processor to perform a method comprising:
    acquiring identification information read from an authentication medium by a reading unit installed in a passage zone:
    acquiring a captured image of the passage zone;
    identifying, from multiple facial image areas included in the captured image, a passerby facial image and an accompanier facial image, wherein a facial image area of a first user, who carries the authentication medium, is identified as either one of the passerby facial image and the accompanier facial image, and a facial image area of a second user, who accompanies the first user, is identified as the other one of the passerby facial image and the accompanier facial image; and
    authenticating the first user and the second user as passage permitted persons if at least one of the passerby facial image and the accompanier facial image matches a correct facial image corresponding to the identification information, wherein the identifying comprises:
    identifying from the captured image a holding part in a body of the user included in the captured image, the holding part holding the authentication medium; and
    identifying, as the first user, a user having the identified holding part as a body part from a plurality of users included in the captured image.

14. The non-transitory computer readable medium according to claim 13, wherein
    at the identifying the first user, the user having the identified holding part as the body part is identified as the first user from the users included in the captured image, based on a position of the holding part, positions of the facial image areas, and pose estimation information of the users extracted from the captured image.

15. The non-transitory computer readable medium according to claim 13, wherein
    the holding part is the user's hand.

16. The non-transitory computer readable medium according to claim 13, wherein
    at the acquiring the captured image, a plurality of captured images is acquired by imaging the passage zone in time sequence, and
    at the identifying the holding part, the holding part is identified based on the captured images by estimating the holding part holding the authentication medium at a time of reading the identification information at the reading unit.

17. A passage management method implemented by a computer, the method comprising:
    acquiring identification information read from an authentication medium by a reading unit installed in a passage zone, the authentication medium including a storage medium storing the identification information;
    acquiring a captured image of the passage zone;
    identifying, from multiple facial image areas included in the captured image, a passerby facial image and an accompanier facial image, wherein a facial image area of a first user, who carries the authentication medium, is identified as one of the passerby facial image and the accompanier facial image, and a facial image area of a second user, who accompanies the first user, is identified as the other one of the passerby facial image and the accompanier facial image; and
    authenticating the first user and the second user as passage permitted persons if at least one of the passerby facial image and the accompanier facial image matches a correct facial image registered in association with the identification information, wherein auxiliary attribute information representing information regarding a mode of a passage of a passerby is associated with the identification information.

18. A passage management apparatus comprising processing circuitry configured to:
    acquire identification information read from an authentication medium by a reading unit installed in a passage zone, the authentication medium including a storage medium storing the identification information;
    acquire a captured image of the passage zone;
    identify, from multiple facial image areas included in the captured image, a facial image area of a first user who carries the authentication medium, as one of a passerby facial image and an accompanier facial image;
    identify, from the multiple facial image areas included in the captured image, a facial image area of a second user who accompanies the first user, as the other one of the passerby facial image and the accompanier facial image; and
    authenticate the first user and the second user as passage permitted persons if at least one of the passerby facial image and the accompanier facial image matches a correct facial image registered in association with the identification information, wherein auxiliary attribute information representing information regarding a mode of a passage of the passerby is associated with the identification information.

* * * * *